US012576335B2

(12) United States Patent
Zhang

(10) Patent No.: US 12,576,335 B2
(45) Date of Patent: Mar. 17, 2026

(54) SELECTIVE GAME LOGIC PROCESSING BY A GAME SERVER

(71) Applicant: Tencent Technology (Shenzhen) Company Limited, Shenzhen (CN)

(72) Inventor: Junkai Zhang, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 344 days.

(21) Appl. No.: 18/376,171

(22) Filed: Oct. 3, 2023

(65) Prior Publication Data

US 2024/0024767 A1 Jan. 25, 2024

Related U.S. Application Data

(63) Continuation of application No. PCT/CN2022/136461, filed on Dec. 5, 2022.

(30) Foreign Application Priority Data

Mar. 15, 2022 (CN) .......................... 202210252384.0

(51) Int. Cl.
*A63F 13/77* (2014.01)
*A63F 13/35* (2014.01)
(Continued)

(52) U.S. Cl.
CPC ............ *A63F 13/35* (2014.09); *A63F 13/355* (2014.09); *A63F 13/52* (2014.09); *A63F 13/77* (2014.09)

(58) Field of Classification Search
CPC ................................. A63F 13/77; A63F 13/355
See application file for complete search history.

(56) References Cited

U.S. PATENT DOCUMENTS

2007/0173332 A1* 7/2007 Liu .......................... A63F 13/35
463/42
2011/0092279 A1* 4/2011 Pilip ....................... A63F 13/63
463/43
(Continued)

FOREIGN PATENT DOCUMENTS

CN 102694832 A 9/2012
CN 110870976 A 3/2020
CN 111790145 A 10/2020

OTHER PUBLICATIONS

International Search Report issued Feb. 20, 2023 in Application No. PCT/CN2022/136461, with English Translation, pp. 1-5.

*Primary Examiner* — Jay Trent Liddle
(74) *Attorney, Agent, or Firm* — ArentFox Schiff LLP

(57) ABSTRACT

A processing method includes acquiring a view list of a target client, the view list identifying at least one client associated with a view area of the target client in a game scene. The method further includes determining a to-be-synchronized client of the target client based on the view list. The method further includes, in response to a first to-be-synchronized client being not visible to the target client, performing game logic processing on first initial game data associated with the first to-be-synchronized client to obtain first game result data for transmitting to the target client. The method further includes, in response to a second to-be-synchronized client being visible to the target client, transmitting second initial game data associated with the second to-be-synchronized client to the target client to enable the target client to perform game logic processing on the second initial game data to obtain second game result data.

20 Claims, 12 Drawing Sheets

(51) Int. Cl.
    *A63F 13/355*       (2014.01)
    *A63F 13/52*        (2014.01)

(56)              References Cited

U.S. PATENT DOCUMENTS

| | | | |
|---|---|---|---|
| 2012/0077586 A1* | 3/2012 | Pishevar | H04N 21/42204 |
| | | | 463/31 |
| 2012/0079080 A1* | 3/2012 | Pishevar | A63F 13/332 |
| | | | 709/220 |
| 2018/0290058 A1* | 10/2018 | Zhang | A63F 13/822 |
| 2021/0001232 A1* | 1/2021 | Tang | A63F 13/31 |
| 2022/0410014 A1* | 12/2022 | Yu | A63F 13/35 |
| 2024/0024767 A1* | 1/2024 | Zhang | A63F 13/77 |

* cited by examiner

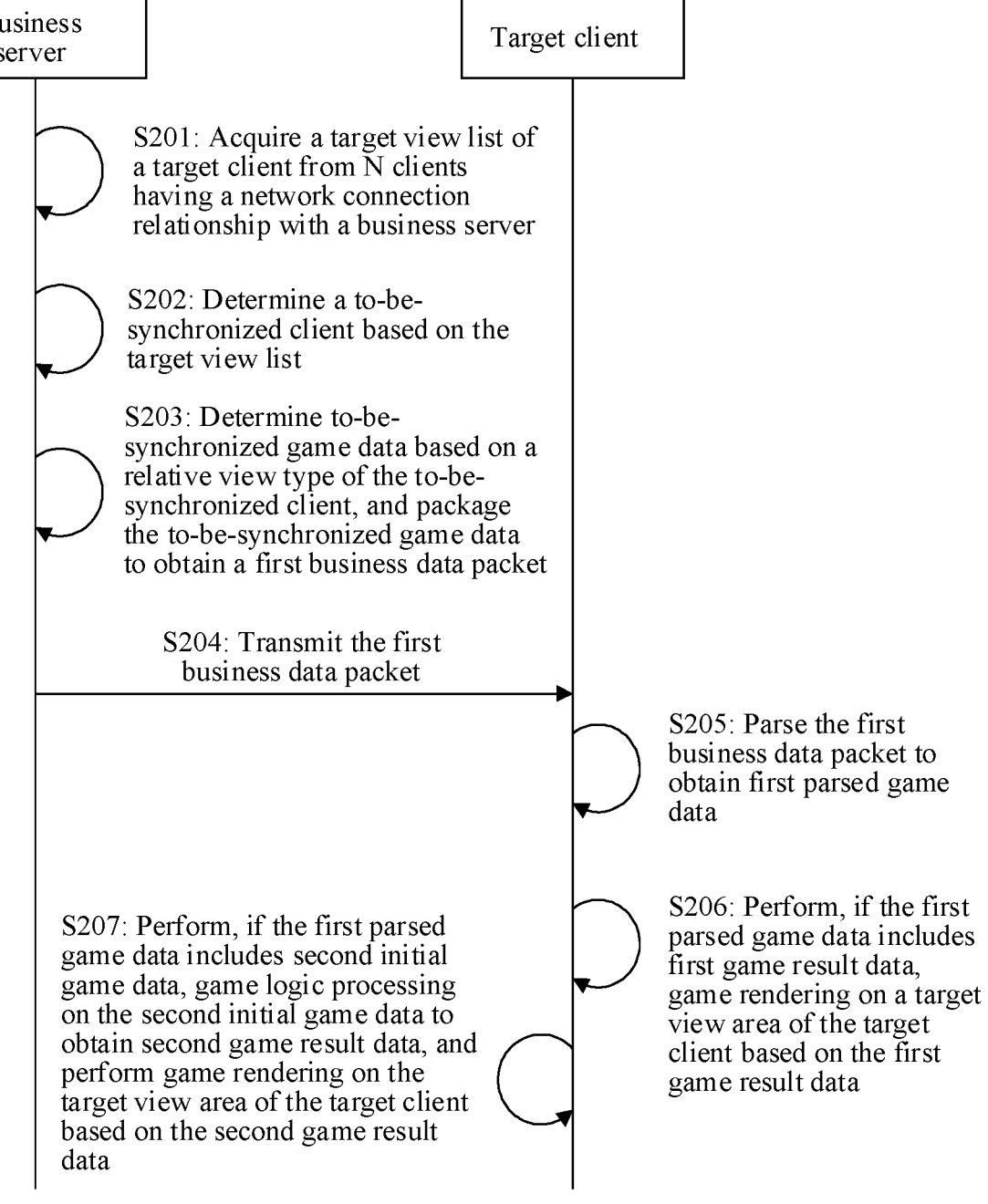

Business server

Target client

S201: Acquire a target view list of a target client from N clients having a network connection relationship with a business server S202: Determine a to-be-synchronized client based on the target view list S203: Determine to-be-synchronized game data based on a relative view type of the to-be-synchronized client, and package the to-be-synchronized game data to obtain a first business data packet S204: Transmit the first business data packet S205: Parse the first business data packet to obtain first parsed game data S206: Perform, if the first parsed game data includes first game result data, game rendering on a target view area of the target client based on the first game result data S207: Perform, if the first parsed game data includes second initial game data, game logic processing on the second initial game data to obtain second game result data, and perform game rendering on the target view area of the target client based on the second game result data

Processor

Communication
bus 3002

3005

Operating system

Network
communication module

User interface module

Device control
application program

Memory

3003

User interface

Display

Keyboard

3004

Network
interface

Computer device

3

Data processing system

1a

Data processing
apparatus

2a

Data processing
apparatus

SELECTIVE GAME LOGIC PROCESSING BY A GAME SERVER

RELATED APPLICATIONS

This application is a continuation of International Application No. PCT/CN2022/136461, filed on Dec. 5, 2022, which claims priority to Chinese Patent Application No. 202210252384.0, entitled "DATA PROCESSING METHOD AND APPARATUS, DEVICE, AND STORAGE MEDIUM", filed on Mar. 15, 2022. The disclosures of the prior applications are hereby incorporated by reference in their entirety.

FIELD OF THE TECHNOLOGY

This application relates to the field of computer technology, including data processing.

BACKGROUND OF THE DISCLOSURE

At present, the traditional communication mode (for example, client-client, referred to as CC mode for short) is a typical communication mode of frame synchronization. In the CC mode, a business server does not participate in the calculation and only plays the role of forwarding messages; while the relevant calculation of frame synchronization is all at the client, and the client can maintain the global state under a game scene, thus resulting in a large amount of local calculation of the client. In a multi-player game scene, it is inevitable that excessive calculation will reduce the synchronization efficiency of game data, so the CC mode is difficult to support an ultra-large multi-player game.

SUMMARY

The embodiments of this disclosure provide a data processing method and apparatus, a device, a storage medium, and a program product, which can improve the synchronization efficiency of game data.

In an embodiment, a data processing method includes acquiring a view list of a target client from N clients having a network connection relationship with a server, N being a positive integer greater than 1. The view list identifies at least one client associated with a view area of the target client in a game scene. The method further includes determining a to-be-synchronized client of the target client based on the view list, the to-be-synchronized client being one of the N clients. The to-be-synchronized client has a relative view type, the relative view type identifying whether the to-be-synchronized client is visible to the target client in the game scene. The method further includes, in response to a first to-be-synchronized client having a relative view type indicating that the first to-be-synchronized client is not visible to the target client, performing game logic processing on first initial game data associated with the first to-be-synchronized client to obtain first game result data for transmitting to the target client. The first game result data is used by the target client to perform game rendering on the view area. The method further includes, in response to a second to-be-synchronized client with a relative view type indicating that the second to-be-synchronized client is visible to the target client, transmitting second initial game data associated with the second to-be-synchronized client to the target client to enable the target client to perform game logic processing on the second initial game data to obtain second game result data. The second game result data is used by the target client to perform game rendering on the view area.

In an embodiment, a data processing method is executed by a terminal device provided with a target client, the target client being one of N clients having a network connection relationship with a server, N being a positive integer greater than 1. The data processing method includes acquiring a first data packet transmitted by the server and associated with a to-be-synchronized client and parsing the first data packet to obtain first parsed game data. The to-be-synchronized client is identified by the server based on a view list of the target client, the to-be-synchronized client belonging to the N clients. The view list identifies a client associated with a view area of the target client in a game scene, the to-be-synchronized client having a relative view type that indicates whether the to-be-synchronized client is visible to the target client in the game scene. The method further includes, when the first parsed game data comprises first game result data, performing game rendering on the view area of the target client based on the first game result data that is obtained after the server performs game logic processing on first initial game data associated with a first to-be-synchronized client having a relative view type indicating that the to-be-synchronized client is not visible to the target client. The method further includes, when the first parsed game data comprises second initial game data, performing game logic processing on the second initial game data to obtain second game result data, and performing game rendering on the view area of the target client based on the second game result data. The second initial game data is associated with a second to-be-synchronized client having a relative view type indicating that the to-be-synchronized client is visible to the target client.

In an embodiment, a data processing apparatus includes processing circuitry configured to acquire a view list of a target client from N clients having a network connection relationship with the apparatus, N being a positive integer greater than 1. The view list identifies at least one client associated with a view area of the target client in a game scene. The processing circuitry is further configured to determine a to-be-synchronized client of the target client based on the view list. The to-be-synchronized client is one of the N clients, and the to-be-synchronized client having a relative view type, the relative view type identifying whether the to-be-synchronized client is visible to the target client in the game scene. The processing circuitry is further configured to, in response to a first to-be-synchronized client having a relative view type indicating that the first to-be-synchronized client is not visible to the target client, perform game logic processing on first initial game data associated with the first to-be-synchronized client to obtain first game result data for transmitting to the target client. The first game result data is used by the target client to perform game rendering on the view area. The processing circuitry is further configured to, in response to a second to-be-synchronized client with a relative view type indicating that the second to-be-synchronized client is visible to the target client, transmit second initial game data associated with the second to-be-synchronized client to the target client to enable the target client to perform game logic processing on the second initial game data to obtain second game result data. The second game result data is used by the target client to perform game rendering on the view area.

In an embodiment of this disclosure, a computer device (for example, a business server) having a view management function may obtain a target view list of a target client from N clients having a network connection relationship with the business server; N is a positive integer greater than 1. Further, the business server may determine a to-be-synchronized client of the target client based on the target view list; the determined to-be-synchronized client has a relative view type, and the relative view type is used for identifying the view type of the to-be-synchronized client relative to the target client in the game scene. Thus, the business server may identify a first to-be-synchronized client of a first view type or a second to-be-synchronized client of a second view type from the to-be-synchronized clients based on the difference in the relative view types. By distinguishing to-be-synchronized clients of different view types, a business server can process first initial game data of a first to-be-synchronized client to obtain first game result data, and then send the first game result data and second initial game data of a second to-be-synchronized client to a target client, so that the target client can directly use the first game result data to perform rendering when performing game rendering on a target view area while obtaining the second game result data to perform rendering only after performing game logic processing on the second initial game data. Through the business server selectively completing the game logic processing of a part of game data for the target client, the target client's computation in frame synchronization is greatly reduced, and the synchronization efficiency of the target client is significantly improved.

BRIEF DESCRIPTION OF THE DRAWINGS

FIG. 8 is a schematic flowchart of a data processing method provided by an embodiment of this disclosure.

DESCRIPTION OF EMBODIMENTS

The technical solutions in the embodiments of this disclosure will be described below in conjunction with the drawings in the embodiments of this application. Obviously, the described embodiments are only a part of the embodiments of this application, and not all of them. All other embodiments, obtained by the ordinarily skilled in the art based on the embodiments of this application, shall fall within the protection scope of this disclosure.

Figure 1:
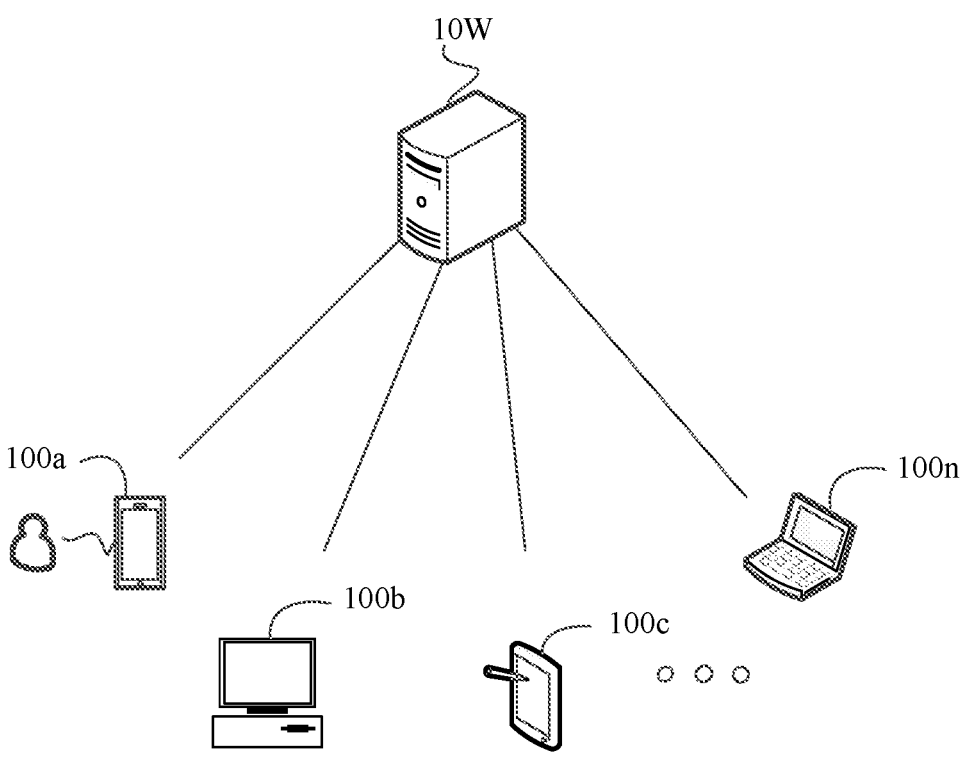
FIG. 1 is a structural diagram of a network architecture provided by an embodiment of this disclosure.

Referring to FIG. 1, FIG. 1 is a structural diagram of a network architecture provided by an embodiment of this disclosure. As shown in FIG. 1, the network architecture may include a server 10W and a terminal device cluster. The terminal device cluster may include one or more terminal devices, the number of terminal devices will not be limited here. As shown in FIG. 1, a terminal device 100a, a terminal device 100b, a terminal device 100c, . . . , and a terminal device 100n may be specifically included. As shown in FIG. 1, the terminal device 100a, the terminal device 100b, the terminal device 100c, . . . , and the terminal device 100n may perform a network connection to the above server 10W, so that each terminal device may perform data interaction with the server 10W through the network connection.

Each terminal device in the terminal device cluster may include a smart terminal with data processing functions such as a smartphone, a tablet, a laptop, a desktop computer, a smart speaker, a smartwatch, a vehicle terminal, and a smart television. It is to be understood that each terminal device in the terminal device cluster as shown in FIG. 1 can be installed with a target application (namely, a client), and when the client runs in each terminal device, data interaction can be performed with the above server 10W as shown in FIG. 1. A client herein can be a client (for example, a game client) capable of supporting a mass combat game or a multi-player online tactical competitive game.

As shown in FIG. 1, the server 10W in the embodiments of this disclosure can be a business server corresponding to the client. The server 10W may be an independent physical server, a server cluster, a distributed system composed of a plurality of physical servers, or a cloud server that provides cloud computing services. The server 10W in the embodiments of this disclosure can have a network connection relationship with a client run by each terminal device of N terminal devices, and the server 10W and each client can simultaneously run a core code module. The core code module here refers to a code module compiled by the game core, and the core code module can keep the data state maintained by the server 10W and the core code module of the client completely consistent at the same moment (namely, the same logical time). It will be appreciated that in order to manage the logical slices (that is, the view area of each client), a view list of each client in the current frame is maintained in the core code module of the server 10W.

To facilitate understanding, an embodiment of this disclosure can select one terminal device from the N terminal devices shown in FIG. 1 as a target terminal device; N is a positive integer greater than 1. For example, an embodiment of this disclosure may use the terminal device 100a shown in FIG. 1 as a target terminal device. The client run by the target terminal device can be referred to as a target client in the embodiments of this disclosure. It will be appreciated that the target terminal device may enable data interaction with the server 10W via the business data platform corresponding to the target client.

It is to be appreciated that when the server 10W obtains a target view list of a target client (for example, client A), the server 10W may determine a to-be-synchronized client of the target client based on the target view list. The target view list here not only includes clients within the target view area of the target client but also includes associated clients outside the target view area of the target client and have an indirect interaction relationship with the target client. The embodiments of this disclosure may refer to a relative view type of a client outside a target view area of the target client as a first view type and a relative view type of a client within the target view area of the target client as a second view type.

The embodiments of this disclosure can provide a new communication mode that combines the advantages of a first communication mode (for example, client-server, abbreviated CS mode) and a second communication mode (for example, CC mode). The CS mode here refers to a communication mode where a server is a center and actively sends a message to a client, and the CS mode can enable the server to have a complete state to perform logic slicing, plug-in calibration, and the like. CC mode refers to a communication mode in which a client sends a message to a server, and the server forwards the message to other clients, and the CC mode is a typical communication mode for frame synchronization and can effectively ensure the state synchronization efficiency of a current frame.

It will be appreciated that if the relative view type of the to-be-synchronized client (for example, client B) determined by the server 10W is a first view type, the server 10W may employ a first communication mode to perform game logic processing on the first initial game data associated with client B such that first game result data for transmitting to the target client may be obtained to enable the target client to perform game rendering on the target view area. Alternatively, if the relative view type of the to-be-synchronized client (for example, client C) determined by the server 10W is a second view type, the server 10W can directly send second initial game data associated with the client C to the target client in a second communication mode, so that the target client performs game logic processing on the second initial game data to obtain second game result data, the second game result data being used for indicating the target client to perform game rendering on the target view area. This means that the server 10W of the embodiments of this disclosure can not only synchronize the relevant game data of the client within the target view area to the target client, but also synchronize the relevant game data of the associated client outside the target view area to the target client; using this new communication mode can not only improve the synchronization efficiency of the game data, but also improve the synchronization accuracy of the game data.

Figure 2:
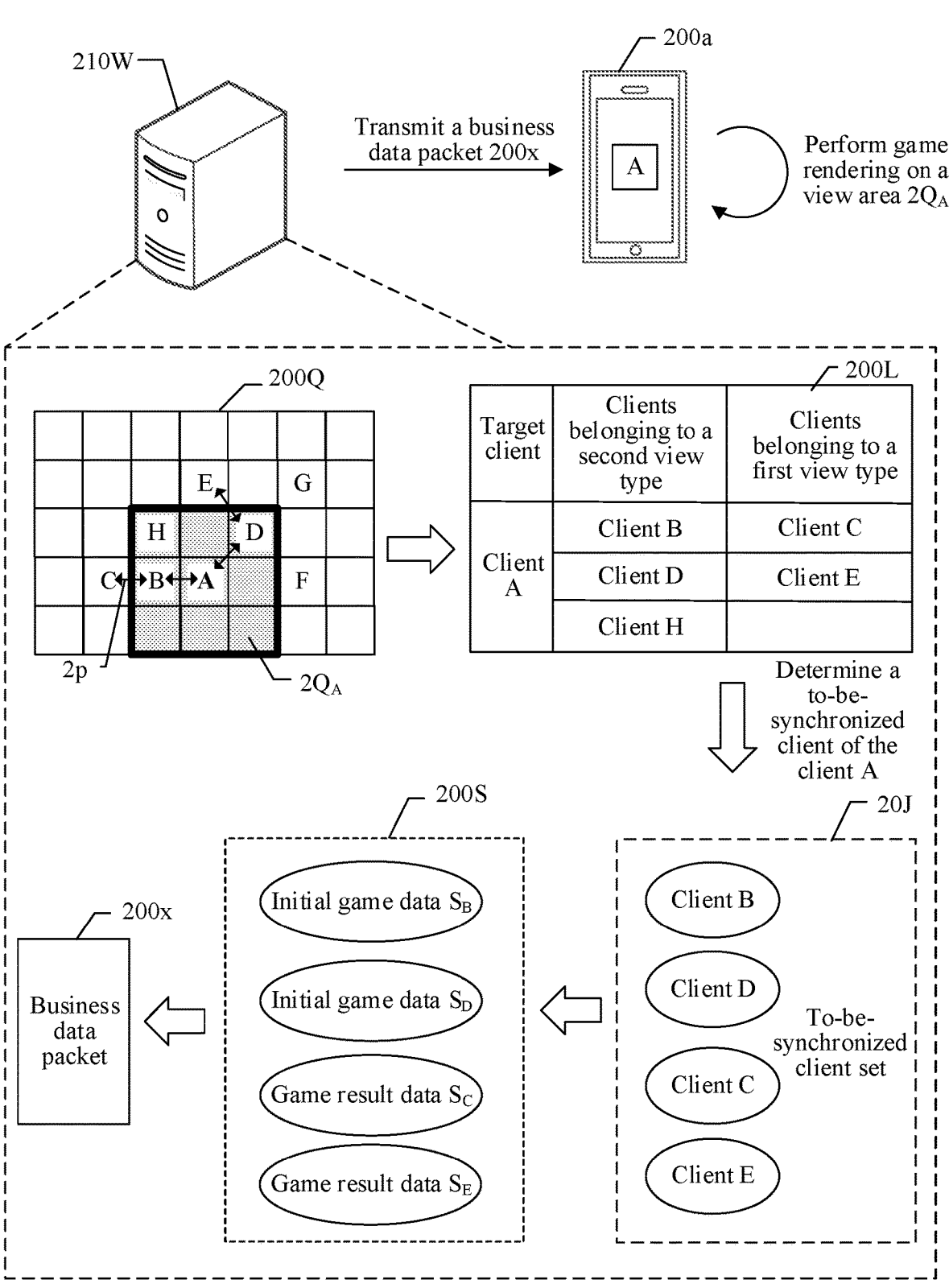
FIG. 2 is a scene diagram for data interaction provided by an embodiment of this disclosure.

For ease of understanding, further, Referring to FIG. 2, FIG. 2 is a scene diagram for data interaction provided by an embodiment of this disclosure. As shown in FIG. 2, the server 210W in the embodiments of this disclosure may be a business server having a view management function, and the server 210W may be the server 10W shown in FIG. 1 described above. The number of clients having a network connection relationship with the server 210W may be N; N is a positive integer greater than 1. For convenience of explanation, N in the embodiments of this disclosure may take eight clients as an example, and these eight clients may include a client A, a client B, a client C, a client D, a client E, a client F, a client G, and a client H. As shown in FIG. 2, for the convenience of explanation, the embodiments of this disclosure can take a client A as a target client as an example to explain the specific implementations of the server 210W using a new communication mode to perform game rendering with the target client; the client A can run in the terminal device 200a shown in FIG. 2, and the terminal device 200a can be any terminal device in the above terminal device cluster shown in FIG. 1, for example, the terminal device 100a.

The core code module of the server 210W in the game scene may maintain a global view area of the current game frame associated with the game scene (for example, view area 200Q shown in FIG. 2), and the view area 200Q may include a target view area of each client. For example, the target view area of client A may be the view area 2QA shown in FIG. 2, and the view area 2QA may include a client B, a client D, and a client H. The arrow 2p in the view area 200Q may indicate that there is a business interaction relationship between the client B and the client C, for example, a game object corresponding to the client C performs a game attack (for example, a bullet attack and a skill attack) on a game object corresponding to the client B, which means that the client C is an associated client having an indirect interaction relationship with the client A.

It is to be appreciated that for client A, the server 210W may obtain a target view list (for example, view list 200L shown in FIG. 2) of the client A according to the view area 200Q shown in FIG. 2. The view list 200L in the embodiments of this disclosure can include a first list column (for example, a target client), a second list column (for example, a client belonging to a first view type), and a third list column (for example, a client belonging to a second view type); of course, the view list 200L can also include other list columns (for example, client identification and a client label), and the specific form of the view list will not be limited here; the client label here can include a "newly added" label, an "associated" label, and the like; so that the server 210W can quickly acquire a to-be-synchronized client of the target client from the view list 200L. As shown in FIG. 2, the view list 200L may indicate that clients within the view area 2QA may include a client B, a client D, and a client H, and the associated clients outside the view area 2QA may include a client C and a client E.

Further, the server 210W may determine a to-be-synchronized client of the client A based on the view list 200L. As shown in FIG. 2, the to-be-synchronized clients in the to-be-synchronized client set 20J may be to-be-synchronized clients associated with the client A determined by the server 210W, and may specifically include the client B, client D, client C, and client E.

As can be appreciated, the server 210W can determine the to-be-synchronized game data (for example, the to-be-synchronized game data 200S shown in FIG. 2) for transmitting to the client A according to the relative view type of each to-be-synchronized client in the to-be-synchronized client set 20J. If the relative view type of the to-be-synchronized client belongs to the first view type, the server 210W can perform game logic processing on the first initial game data associated with the to-be-synchronized client, so that the first game result data for sending to the client A can be obtained, so that the client A performs game rendering on the view area 2QA. The first game result data refers to game result data obtained after the server 210W performs game logic processing on the first initial game data of the to-be-synchronized client belonging to the first view type. Alternatively, if the relative view type of the to-be-synchronized client belongs to the second view type, the server 210W may send the second initial game data associated with the to-be-synchronized client to the client A so that the client A performs game logic processing on the second initial game data so that second game result data for game rendering of the view area 2QA may be obtained. The second game result data herein refers to game result data obtained after the client A (namely, the target client) performs game logic processing on the received second initial game data of the to-be-synchronized client belonging to the second view type.

For example, for the client B, the server 210W can determine that the relative view type of the client B belongs to the second view type, and at this moment, the server 210W can acquire initial game data (namely, the initial game data $S_B$ shown in FIG. 2) associated with the client B. For the client D, the server 210W can determine that the relative view type of the client D belongs to a second view type, and at this moment, the server 210W can acquire initial game data (namely, the initial game data $S_D$ shown in FIG. 2) associated with the client D. For the client C, the server 210W can determine that the relative view type of the client C belongs to the first view type, and at this moment, the server 210W can acquire the initial game data associated with the client C and then can perform game logic processing on the initial game data associated with the client C, to obtain the game result data $S_C$ shown in FIG. 2. Similarly, for the client E, the server 210W may obtain the game result data $S_E$ shown in FIG. 2. Further, the server 210W can obtain the to-be-synchronized game data 200S for sending to the client A based on the initial game data $S_B$, the initial game data $S_D$, the game result data $S_C$, and the game result data $S_E$, and can obtain the business data packet 200x shown in FIG. 2 by packaging the to-be-synchronized game data 200S. Further, the server 210W can send the business data packet 200x to the client A run by the terminal device 200a, so that the client A performs game rendering on the view area $2Q_A$ based on the business data packet 200x.

It can be understood that when acquiring the business data packet 200x, the client A can parse the business data packet 200x to obtain parsed game data, namely, the parsed game data here can include initial game data $S_B$, initial game data $S_D$, game result data $S_C$, and game result data $S_E$. Further, if the parsed game data obtained by the client A is game result data $S_C$ or game result data $S_E$, the client A can directly perform game rendering on the view area $2Q_A$ based on the game result data $S_C$ or the game result data $S_E$. If the parsed game data obtained by the client A is the initial game data $S_B$ or the initial game data $S_D$, the client A needs to perform game logic processing on the initial game data $S_B$ or the initial game data $S_D$, and further performs game rendering on the view area $2Q_A$ based on the second game result data (for example, the second game result data corresponding to the initial game data $S_B$ or the second game result data corresponding to the initial game data $S_D$) obtained after the game logic processing.

It can be seen therefrom that the server 210W (namely, a business server) in the embodiments of this disclosure can use this new communication mode to send different to-be-synchronized game data to a target client based on the relative view type of the to-be-synchronized client. For example, if the relative view type of the to-be-synchronized client belongs to the second view type (namely, within the target view area), the server 210W can directly synchronize the initial game data $S_B$ and the initial game data $S_D$ shown in FIG. 2 to the client A, so that the client A performs game logic processing on the two pieces of initial game data. If the relative view type of the to-be-synchronized client belongs to the first view type (namely, outside the target view area), the server 210W can directly send the game logic processed game result data $S_C$ and game result data $S_E$ to the client A. This means that the server 210W (that is, a business server) in the embodiments of this disclosure can not only synchronize relevant game data of a client within the view area $2Q_A$ (that is, a target view area) to the client A (that is, a target client) but also synchronize relevant game data of an associated client outside the view area $2Q_A$ to the client A. Using this new communication mode can not only improve the synchronization efficiency of game data but also improve the synchronization accuracy of game data.

The specific implementation of the business server adopting a new communication mode to perform game rendering on the target view area of the target client can refer to the following embodiments corresponding to FIG. 3 to FIG. 10.

Figure 3:
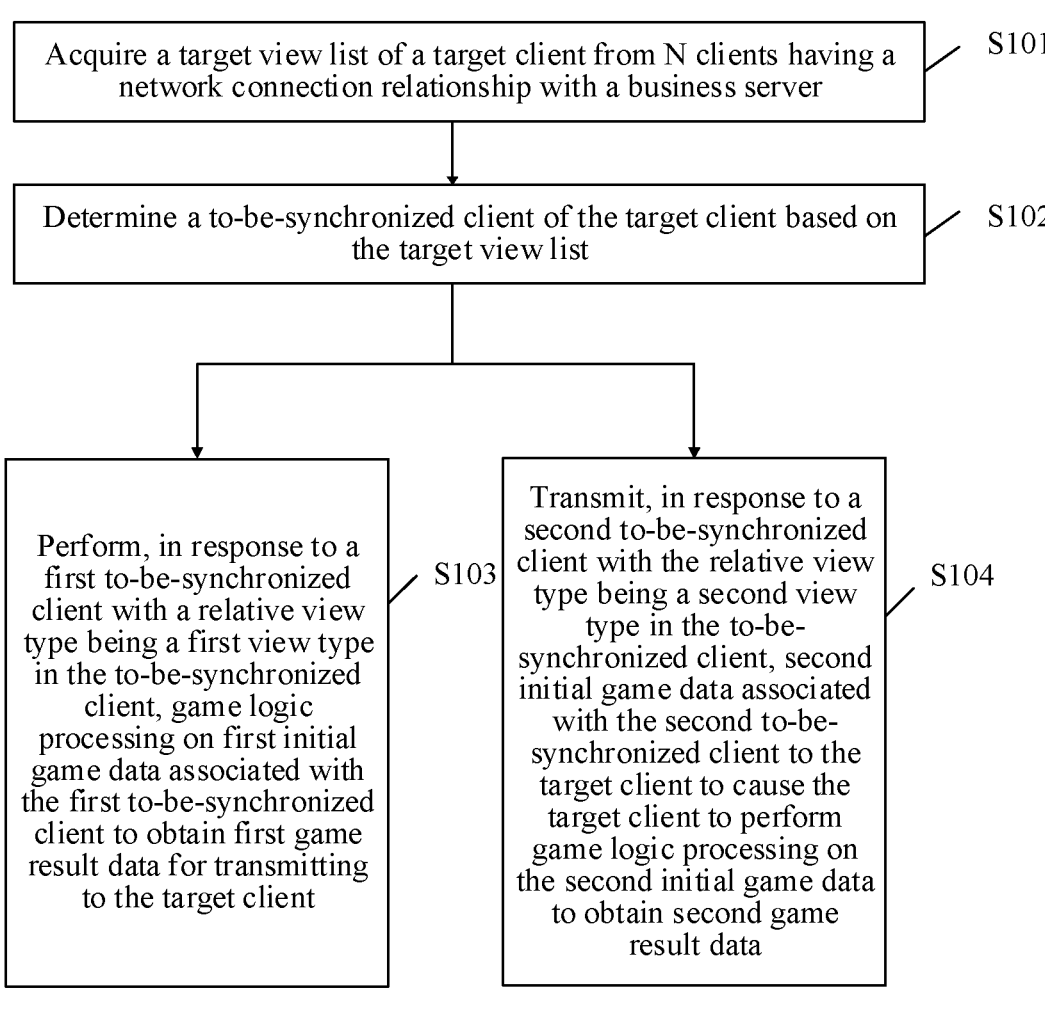
FIG. 3 is a schematic flowchart of a data processing method provided by an embodiment of this disclosure.

Further, Referring to FIG. 3, FIG. 3 is a schematic flowchart of a data processing method provided by an embodiment of this disclosure. As shown in FIG. 3, the method may be performed by a computer device having a view management function; the computer device may be a terminal device (for example, the terminal device 100a shown in FIG. 1 described above) or a business server (for example, the server 10W shown in FIG. 1 described above), without being limited thereto. To facilitate understanding, the embodiments of this disclosure will be described with the example of the method being performed by a business server, and the method may include at least the following S101 to S104:

S101: Acquire a target view list of a target client from N clients having a network connection relationship with the business server. For example, a view list is acquired of a target client from N clients having a network connection relationship with a server. N is a positive integer greater than 1. The view list identifies at least one client associated with a view area of the target client in a game scene.

The target view list is used for identifying a client associated with a target view area of the target client in a game scene.

Specifically, the business server having a view management function may acquire a first initial view list of a target client from N clients having a network connection relationship therewith. The target client here refers to any client obtained by traversing these N clients; N is a positive integer greater than 1. The first initial view list refers to a view list generated based on the client in the target view area of the target client when the current game picture frame is the first game picture frame. Further, when a current game picture frame is switched from a first game picture frame to a second game picture frame (namely, a next game picture frame of the first game picture frame), the business server may perform client state detection on a target view area of a target client to obtain a state detection result. Further, the business server may update the first initial view list based on the state detection result, and determine the updated first initial view list as a second initial view list of the target client. The second initial view list refers to a view list generated based on the client in the target view area of the target client when the current game picture frame is the second game picture frame. Further, according to a second initial view list corresponding to each client of the N clients, the business server can determine an associated client of the target client. The associated client refers to a client that is outside the target view area of the target client and has a business interaction relationship with the client within the target view area of the target client. At this time, the business server may add the associated client to the second initial view list of the target client, and take the added second initial view list as the target view list of the target client.

The first initial view list may include a first client within the target view area. The embodiments of this disclosure may refer to a client that is within a target view area at the time of a first game picture frame as a first client, and a client that newly enters the target view area at the time of a second game picture frame as a second client. It can be appreciated that when a current game picture frame is switched from a first game picture frame to a second game picture frame, a business server needs to detect whether a game object corresponding to other client enters or leaves a target view area of the target client. In other words, the business server can perform client state detection on the target view area of the target client to obtain a state detection result, and may further update the first initial view list based on the state detection result, and determine the updated first initial view list as the second initial view list of the target client.

If the state detection result indicates that there is a first client with a first state (that is, a client leaving the target view area), the business server may delete the first client in the first state from the first initial view list. The first state refers to a business state changed from within the target view area to outside the target view area (i.e., movement of the client from within the view area to outside the view area). Alternatively, if the state detection result indicates that there is a second client with a second state (that is, a client entering the target view area), the business server may add the second client to the first initial view list. The second state here refers to a business state changed from outside the target view area to within the target view area (i.e., movement of the client from outside the view area to within the view area), and the first client and the second client both belong to N clients.

By the same reasoning, the business server can obtain a second initial view list corresponding to each client in the N clients by referring to the specific implementation of obtaining a second initial view list of the target client, and the description thereof will not be continued. Further, the business server may determine a client in the second initial view list of the target client as an initial client, and may further determine a candidate client of the target client, that is, a potential synchronization object, based on the second view list of the initial client and the second initial view list of the target client. If it is detected that a business interaction relationship exists between the candidate client and the initial client, the business server may take the candidate client as an associated client of the target client, and may further add the associated client to a second initial view list of the target client, and take the added second initial view list as a target view list of the target client. Alternatively, if it is detected that there is no business interaction relationship between the candidate client and the initial client, the business server may determine that the candidate client is in an idle state, and further may determine that the candidate client does not need to be synchronized to the target client, and therefore the business server does not need to add the candidate client in an idle state to the second initial view list, in other words, the business server may directly use the second initial view list as the target view list of the target client.

Figure 4:
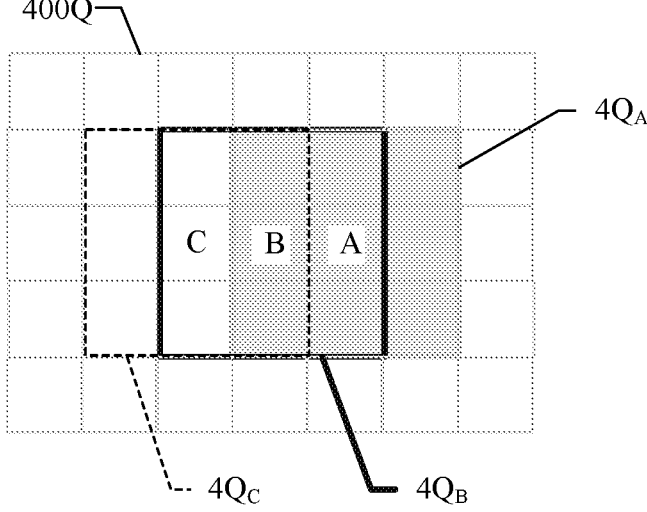
FIG. 4 is a global view diagram maintained by a business server provided by an embodiment of this disclosure.

Further, referring to Table 1, Table 1 is a pseudo-code schematic table for indicating a business server to determine an associated client of a target client provided by an embodiment of this disclosure. The global view maintained by the business server in Table 1 can be seen from the following FIG. 4, and FIG. 4 is a global view diagram maintained by a business server provided by an embodiment of this disclosure. As shown in FIG. 4, a business server in an embodiment of this disclosure may be a server 210W shown in FIG. 2, and N clients having a network connection relationship with the business server may include a client A, a client B, and a client C included in a global view area 400Q shown in FIG. 4.

TABLE 1

```
Server = {a, b, c}//A second initial view list corresponding to the server in
the global view area
A = {a, b}//A second initial view list corresponding to client A
B = {a, b, c}//A second initial view list corresponding to client B
C = {b, c}//A second initial view list corresponding to client C
foreach(var player in Server)//Traversal a target client
{
    X = GetMap (player)//Acquire a second initial view list of a target cli-
ent
    foreach(var other in X)//Traversal initial clients of an X set other than a
    target client
    {
    if(player! = other)//There is an initial client other than a target client
        {
        Y = GetMap (other)//Acquire a second initial view list of an initial
        client
        Z = Y-X//Determine a candidate client
        W = CheckAttackHistory (Z, other)//Detect a candidate client having
a business interaction relationship with an initial client to obtain a W set
        }
    }
}
```

As shown in FIG. 4, a business server in an embodiment of this disclosure can maintain a view list corresponding to a global view area 400Q, a second initial view list corresponding to a client A, a second initial view list corresponding to a client B, and a second initial view list corresponding to a client C. The target view area of the client A can be the view area $4Q_A$ shown in FIG. 4. The target view area of the client B can be the view area $4Q_B$ shown in FIG. 4. The target view area of client C may be the view area $4Q_C$ shown in FIG. 4.

The target client in the embodiments of this disclosure can take client A as an example, and the business server can determine an X set based on the acquired second initial view list of client A, and then an initial client (for example, client B) other than the target client can be acquired from the X set. Further, the business server may determine the set Y based on the obtained second initial view list of the client B. Based on a set relationship between an X set and a Y set, it can be determined that the X set and the Y set needs to intersect, and then the business server can obtain a Z set for representing a candidate client (namely, a potential synchronization object) based on the X set and the Y set. For example, client C may be included in the set Z. Further, the business server needs to determine whether a business interaction relationship exists between the client C and the client B, and if so, the business server determines that the client C is an associated client of the client A, that is, game result data corresponding to the client C needs to be synchronized to the client A subsequently. If not, the business server determines that client C is in an idle state, that is, there is no need to synchronize the relevant game data of client C to client A.

Figure 5:
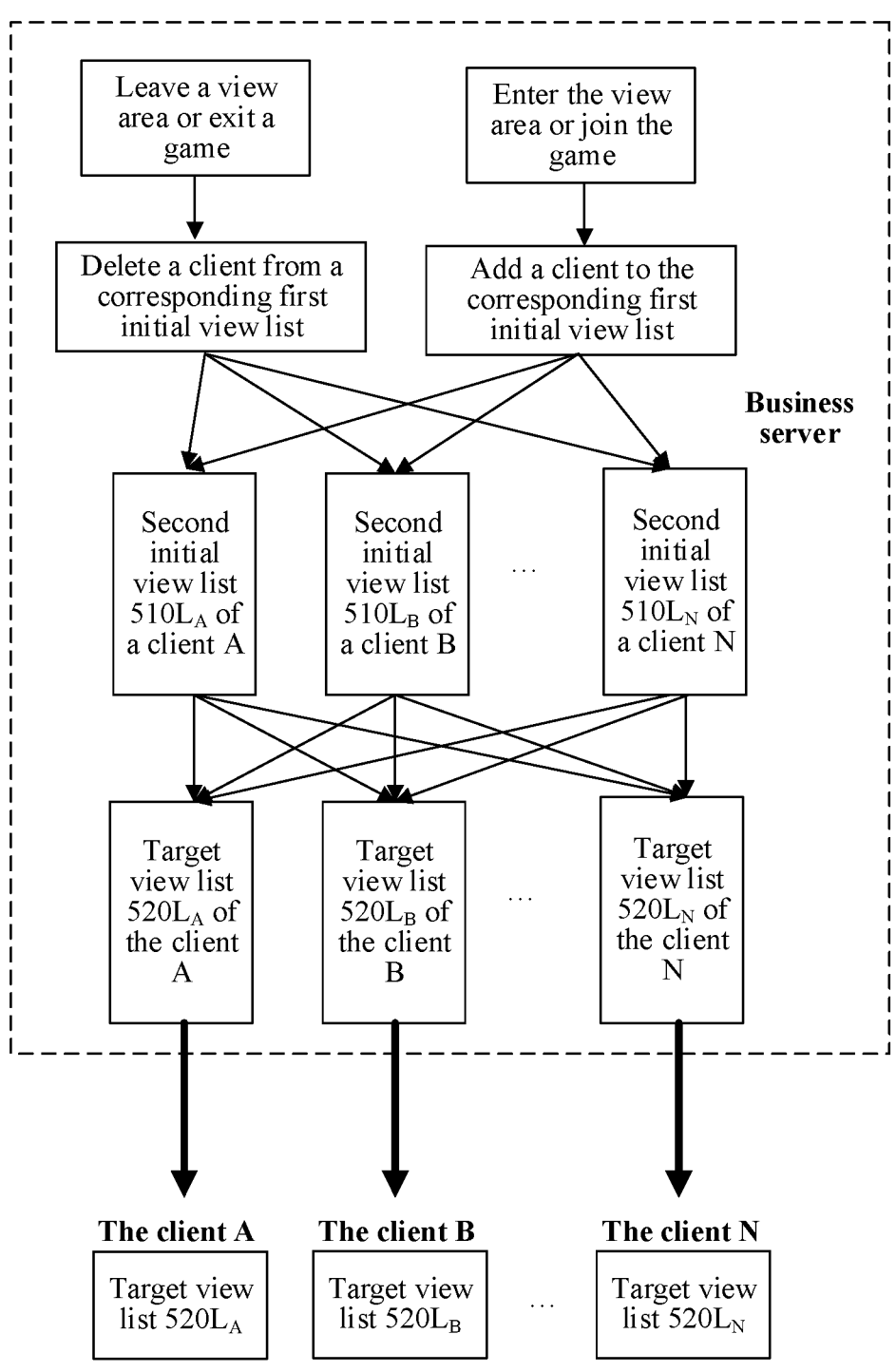
FIG. 5 is a scene diagram for updating a view list provided by an embodiment of this disclosure.

For ease of understanding, further, referring to FIG. 5, FIG. 5 is a scene diagram for updating a view list provided by an embodiment of this disclosure. As shown in FIG. 5, the business server in the embodiments of this disclosure can be a computer device having a view management function. The business server can be the server 10W in the embodiment corresponding to FIG. 1 mentioned above; the number of clients having a network connection relationship with the business server can be N, and N is a positive integer greater than 1 and specifically can include a client A, a client B, . . . , and a client N. The N clients are all used for executing a game business corresponding to the same game, for example, a shooting game.

As shown in FIG. 5, the view management function of the business server is a logic cutting management function; the view area here can be understood as the game visible range of the current client; in other words, the business server can perform client state detection on the view area of each client of the N clients to obtain a state detection result, and can further update the first initial view list of each client based on the state detection result to obtain a second initial view list of each client. For example, taking client A as an example, if the state detection result obtained by the business server indicates that there is a first client having a first state (for example, client C), this means that client C leaves the view area of client A or the game object corresponding to client C exits the shooting game, at this time, the business server also does not need to send the key code value associated with the game operation determined by the game object corresponding to client C to client A. Based on this, the business server can delete the client C from the first initial view list (for example, the first initial view list $500L_A$) of client A. Alternatively, if the state detection result obtained by the business server indicates that there is a second client having a second state (for example, client D), this means that client D enters the view area of client A or the game object corresponding to client D joins the shooting game, the business server may add client D in the first initial view list $500L_A$ of client A. Further, when the updating of the first initial view list $500L_A$ is completed, the business server may determine the updated first initial view list $500L_A$ as a second initial view list $510L_A$ of the client A. By analogy, the business server can obtain the second initial view list $510L_B$ of the client B, . . . , and the second initial view list $510L_B$ of the client N by referring to a specific implementation of updating the first initial view list $500L_A$ of the client A to obtain the second initial view list $510L_A$ of the client A. Of course, if a certain client exits the shooting game, there is no network connection relationship between the business server and the client, namely, there is no need to update and maintain the view list of the client.

Further, when the business server obtains a second initial view list corresponding to each client of the N clients, the business server can determine an associated client of each client. For example, the business server can determine the associated client of client A when obtaining the second initial view list of each client, that is, the client that is outside the view area of client A and has a business interaction relationship with the client in the second initial view list $510L_A$ of client A. Although the associated client of the client A is outside the view area of the client A, a game attack, for example, a bullet attack, can be initiated on a game object within the view area of the client A by executing a game operation to change the object state data of the game object within the view area of the client A. Based on this, the embodiments of this disclosure can consider that the associated client of the client A is also indirectly exposed in the view area of the client A, and therefore the business server needs to add the associated client of the client A to the second initial view list $510L_A$ of the client A. The added second initial view list $510L_A$ is then taken as the client A's target view list $520L_A$. By analogy, the business server may refer to the specific implementation of determining the target view list $520L_A$ of the client A to obtain the target view list $520L$ B of the client B, . . . , and the target view list $520L$ B of the client N.

Further, the business server can push the target view list of each client to the corresponding client, namely, the business server can push the target view list $520L_A$ to the client A, push the target view list $520L_B$ to the client B, . . . , and push the target view list $520L_N$ to the client N.

S102: Determine a to-be-synchronized client of the target client based on the target view list. For example, a to-be-synchronized client of the target client is determined based on the view list. The to-be-synchronized client is one of the N clients, and the to-be-synchronized client having a relative view type. The relative view type identifies whether the to-be-synchronized client is visible to the target client in the game scene.

The to-be-synchronized client and the target client both belong to N clients. Specifically, the business server may collectively refer to the associated clients in the target view list and clients within the target view area that respond to corresponding gaming operations as to-be-synchronized clients of the target client. For example, when a game object corresponding to a certain client in a target view area performs a game operation (for example, a direction operation such as a left shift and a skill operation such as shooting), the business server may take the client responding to the game operation as a to-be-synchronized client of the target client. The to-be-synchronized client has a relative view type for identifying a view type of the to-be-synchronized client relative to the target client in the game scene.

As shown in FIG. 2, since a business interaction relationship exists between the client B and the client C, a business interaction relationship exists between the client B and the client A, a business interaction relationship exists between the client A and the client D, and a business interaction relationship exists between the client D and the client E, the server 210W can take the client B, the client D, the client C, and the client E as a to-be-synchronized client of the client A based on the view list 200L.

S103: Perform, in response to a first to-be-synchronized client with the relative view type being a first view type in the to-be-synchronized client, game logic processing on first initial game data associated with the first to-be-synchronized client to obtain first game result data for transmitting to the target client. For example, game logic processing is performed on first initial game data associated with the first to-be-synchronized client to obtain first game result data for transmitting to the target client, in response to the first to-be-synchronized client having a relative view type indicating that the first to-be-synchronized client is not visible to the target client. The first game result data is used by the target client to perform game rendering on the view area.

Figure 6:
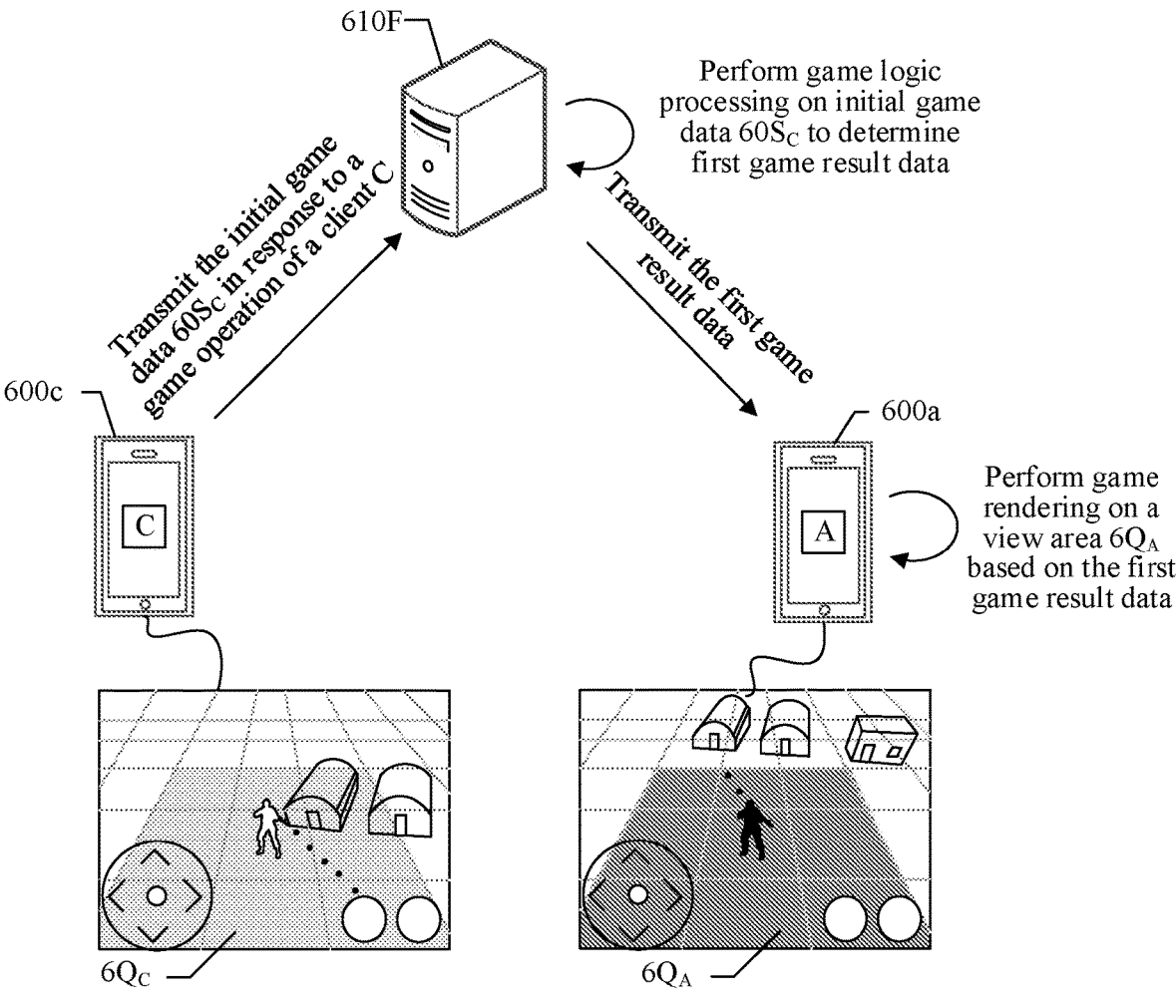
FIG. 6 is a scene diagram for synchronizing game data corresponding to a to-be-synchronized client belonging to a first view type provided by an embodiment of this disclosure.

For ease of understanding, further, referring to FIG. 6, FIG. 6 is a scene diagram for synchronizing game data corresponding to a to-be-synchronized client belonging to a first view type provided by an embodiment of this disclosure. As shown in FIG. 6, the business server 610F in the embodiments of this disclosure can be a business server having a view management function in the embodiment corresponding to the above FIG. 4; the client A running in the terminal device 600*a* in the embodiments of this disclosure can be the client A (namely, a target client) in the embodiment corresponding to the above FIG. 4; and the to-be-synchronized client determined by the business server 310F can be the client C running in the terminal device 600*c*, and the client C can be the client C in the embodiment corresponding to the above FIG. 4.

As shown in FIG. 6, the client C is outside the view area $6Q_A$ of the client A; therefore, when acquiring the initial game data $60S_C$ (namely, the first initial game data) sent by the client C, the business server 610F can determine that the relative view type of the client C belongs to the first view type and belongs to the first to-be-synchronized client. The initial game data $60S_C$ herein is generated when the terminal device 600*c* where the client C is located responds to a game operation; the game operation herein refers to a trigger operation performed by a game object (for example, game object 1) corresponding to the client C in a target view area (for example, view area $6Q_C$) of the client C, and the trigger operation may include a contact operation such as clicking and long-pressing, and may also include a non-contact operation such as voice and gesture, which will not be limited herein.

At this time, the business server 610F needs to perform game logic processing on the acquired initial game data $60S_C$ so that the first game result data for transmitting to the client A can be obtained. For example, the first game result data herein may include a game attack effect (for example, game bullet animation) released by the game object 1 (that is, the controlled game character) corresponding to the client C, a virtual sign value (for example, game life value, virtual health value, and remaining bullets) required to be deducted by the game object (for example, game object 2) corresponding to the client A, a reduced defense force required by the game object 2, an apparel animation effect, and the like. Further, the business server 610F may send the first game result data directly to the client A such that the client A plays game rendering on the view area $6Q_A$ based on the first game result data, for example, directly synchronizes the animations of game bullets released by the client C.

S104: Transmit, in response to a second to-be-synchronized client with the relative view type being a second view type in the to-be-synchronized client, second initial game data associated with the second to-be-synchronized client to the target client to cause the target client to perform game logic processing on the second initial game data to obtain second game result data. For example, second initial game data associated with the second to-be-synchronized client is transmitted to the target client to enable the target client to perform game logic processing on the second initial game data to obtain second game result data, in response to a second to-be-synchronized client with a relative view type indicating that the second to-be-synchronized client is visible to the target client. The second game result data is used by the target client to perform game rendering on the view area.

Figure 7:
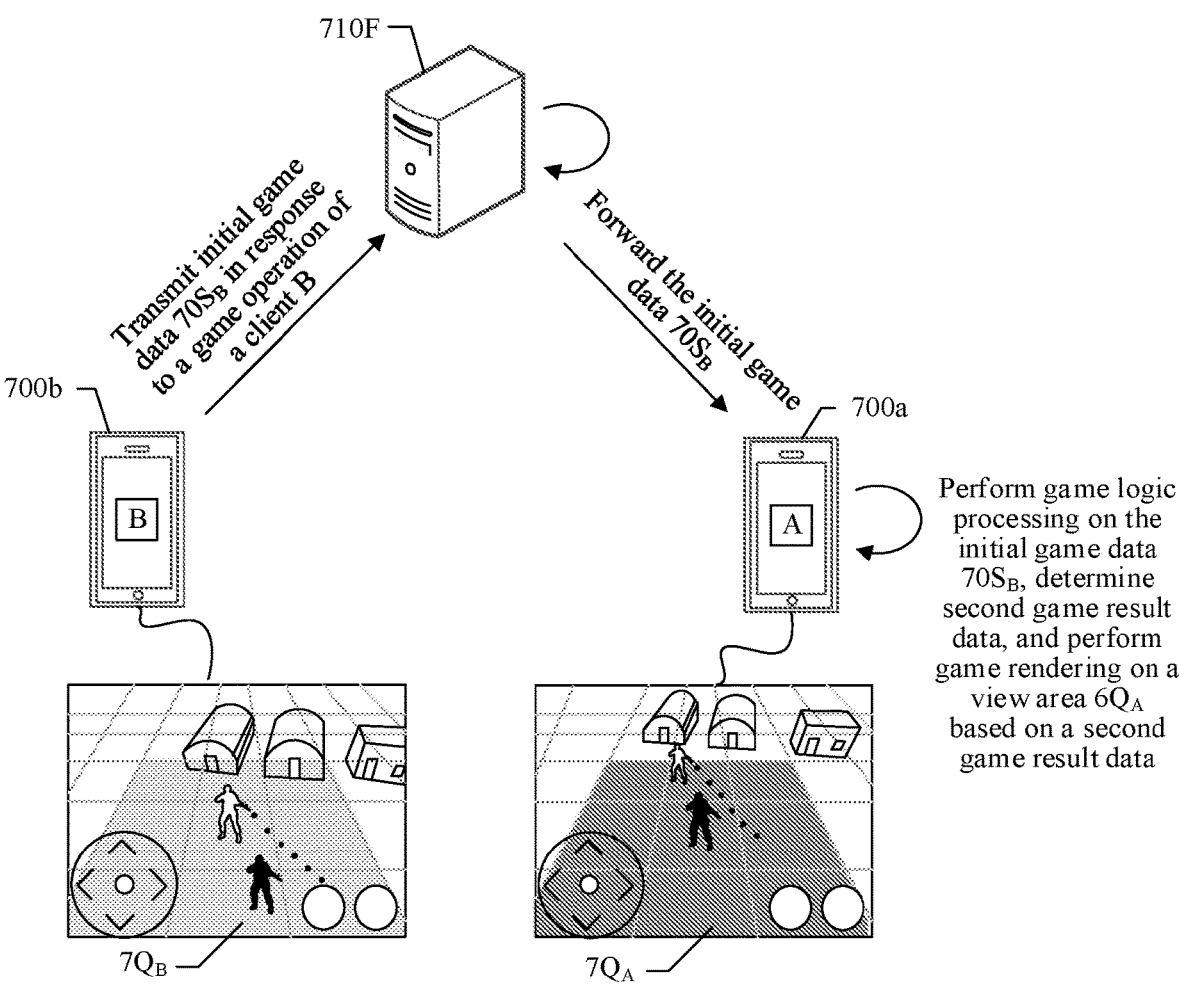
FIG. 7 is a scene diagram for synchronizing game data corresponding to a to-be-synchronized client belonging to a second view type provided by an embodiment of this disclosure.

For ease of understanding, further, referring to FIG. 7, FIG. 7 is a scene diagram for synchronizing game data corresponding to a to-be-synchronized client belonging to a second view type provided by an embodiment of this disclosure. As shown in FIG. 7, the business server 710F in the embodiments of this disclosure can be a business server having a view management function in the embodiment corresponding to the above FIG. 4; the client A running in the terminal device 700*a* in the embodiments of this disclosure can be the client A (namely, a target client) in the embodiment corresponding to the above FIG. 4; and the to-be-synchronized client determined by the business server 710F can be the client B running in the terminal device 700*b*, and the client B can be the client B in the embodiment corresponding to the above FIG. 4.

As shown in FIG. 7, the client B is within the view area $7Q_A$ of the client A; therefore, when the business server 710F acquires the initial game data $70S_B$ (namely, the second initial game data, a key code value corresponding to the business interaction relationship between the client B and the client A) sent by the client B, it can be determined that the relative view type of the client B is a second view type and is a second to-be-synchronized client. The initial game data $70S_B$ is generated when the terminal device 700*b* where the client B is located responds to a game operation (for example, a direction movement operation, a skill operation, a squat operation, and a jump operation); the game operation herein refers to a trigger operation performed by a game object (for example, game object 3) corresponding to the client B in a target view area (for example, view area $7Q_B$) of the client B, and the trigger operation may include a contact operation such as clicking and long-pressing, and may also include a non-contact operation such as voice and gesture, which will not be limited herein. The key code value refers to a numerical value having a mapping relationship with a game operation (for example, a shooting operation in a skill operation).

At this time, the business server 710F can directly forward the initial game data $70S_B$ to the client A, so that when obtaining the initial game data $70S_B$, the client A can perform game logic processing on the initial game data $70S_B$ to obtain the second game result data, and then can perform game rendering on the view area $7Q_A$ based on the second game result data. For example, a game bullet animation released by the game object 3 corresponding to client B is created locally at client A.

In an embodiment of this disclosure, a computer device (for example, a business server) having a view management function may obtain a target view list of a target client from N clients having a network connection relationship with the business server; N is a positive integer greater than 1. Further, the business server may determine a to-be-synchronized client of the target client based on the target view list; the determined to-be-synchronized client has a relative view type, and the relative view type is used for identifying the view type of the to-be-synchronized client relative to the target client in the game scene. Thus, the business server may identify a first to-be-synchronized client of a first view type or a second to-be-synchronized client of a second view type from the to-be-synchronized clients based on the difference in the relative view types. By distinguishing to-be-synchronized clients of different view types, a business server can process the first initial game data of a first to-be-synchronized client to obtain the first game result data, and then send the first game result data and second initial game data of a second to-be-synchronized client to a target client, so that the target client can directly use the first game result data to perform rendering when performing game rendering on a target view area while obtaining the second game result data to perform rendering only after performing game logic processing on the second initial game data. Through the business server selectively completing the game logic processing of a part of game data for the target client, the amount of computation of the target client in frame synchronization is greatly reduced, and the synchronization efficiency of the target client is significantly improved.

Further, Referring to FIG. 8, FIG. 8 is a schematic flowchart of a data processing method provided by an embodiment of this disclosure. As shown in FIG. 8, the method may be performed interactively by a target client and a business server having a view management function, and the terminal device may be any terminal device of the terminal device clusters shown in FIG. 1 described above, for example, terminal device 100*a*. The business server may be the server 10W shown in FIG. 1. The method may include at least the following S201 to S207:

S201: A business server acquires a target view list of a target client from N clients having a network connection relationship with the business server.

Specifically, the business server having a view management function may acquire a first initial view list of a target client from N clients having a network connection relationship therewith. The target client here refers to any client obtained by traversing these N clients; N is a positive integer greater than 1. The first initial view list refers to a view list generated based on the client in the target view area of the target client when the current game picture frame is the first game picture frame. Further, when a current game picture frame is switched from a first game picture frame to a second game picture frame (namely, a next game picture frame of the first game picture frame), the business server may perform client state detection on a target view area of a target client to obtain a state detection result. Further, the business server may update the first initial view list based on the state detection result, and determine the updated first initial view list as a second initial view list of the target client. The second initial view list refers to a view list generated based on the client in the target view area of the target client when the current game picture frame is the second game picture frame. Further, upon obtaining a second initial view list corresponding to each client of the N clients, the business server can determine an associated client of the target client. The associated client refers to a client that is outside the target view area of the target client and has a business interaction relationship with the client within the target view area of the target client. At this time, the business server may add the associated client to the second initial view list of the target client, and take the added second initial view list as the target view list of the target client.

S202: The business server determines a to-be-synchronized client of the target client based on the target view list.

The to-be-synchronized client and the target client both belong to N clients. Specifically, the business server may collectively refer to the associated clients in the target view list and the clients that have a business interaction relationship with the target client within the target view area as to-be-synchronized clients of the target client.

S203: The business server determines to-be-synchronized game data associated with the to-be-synchronized client based on the relative view type of the to-be-synchronized client, and packages the to-be-synchronized game data to obtain a first business data packet.

Specifically, if the relative view type of the to-be-synchronized client belongs to the first view type of the target client, the business server may perform game logic processing on the first initial game data associated with the to-be-synchronized client to obtain the first game result data for transmitting to the target client. Alternatively, if the relative view type of the to-be-synchronized client belongs to a second view type of the target client, the business server may obtain second initial game data associated with the to-be-synchronized client. Further, the business server can determine to-be-synchronized game data associated with the to-be-synchronized client based on the game logic processed first game result data and the acquired second initial game data and can obtain a first business data packet by packaging the to-be-synchronized game data.

As shown in FIG. 2, a to-be-synchronized client of client A determined by server 210W based on view list 200L in an embodiment of this disclosure may include a client B, a client D, a client C, and a client E. Thus, the server 210W may determine the to-be-synchronized data for transmitting to client A according to the relative view type of each to-be-synchronized client. For example, the server 210W can take the initial game data $S_B$ associated with the client B, the initial game data $S_D$ associated with the client D, the game result data $S_C$ after performing game logic processing on the initial game data associated with the client C, and the game result data $S_E$ after performing game logic processing on the initial game data associated with the client E as the to-be-synchronized game data 200S sent to the client A, and can obtain the business data packet 200x shown in FIG. 2 by packaging the to-be-synchronized game data 200S.

S204: The business server transmits a first business data packet to a target client.

S205: The target client parses the first business data packet to obtain first parsed game data.

S206: The target client performs, if the first parsed game data includes first game result data, game rendering on the target view area of the target client based on the first game result data.

S207: The target client performs, if the first parsed game data includes the second initial game data, game logic processing on the second initial game data to obtain second game result data, and performs game rendering on the target view area of the target client based on the second game result data.

The specific implementations of S201 to S207 can be referred to the description of S101 to S104 in the embodiment corresponding to FIG. 3 above, and will not be described again here.

Figure 9:
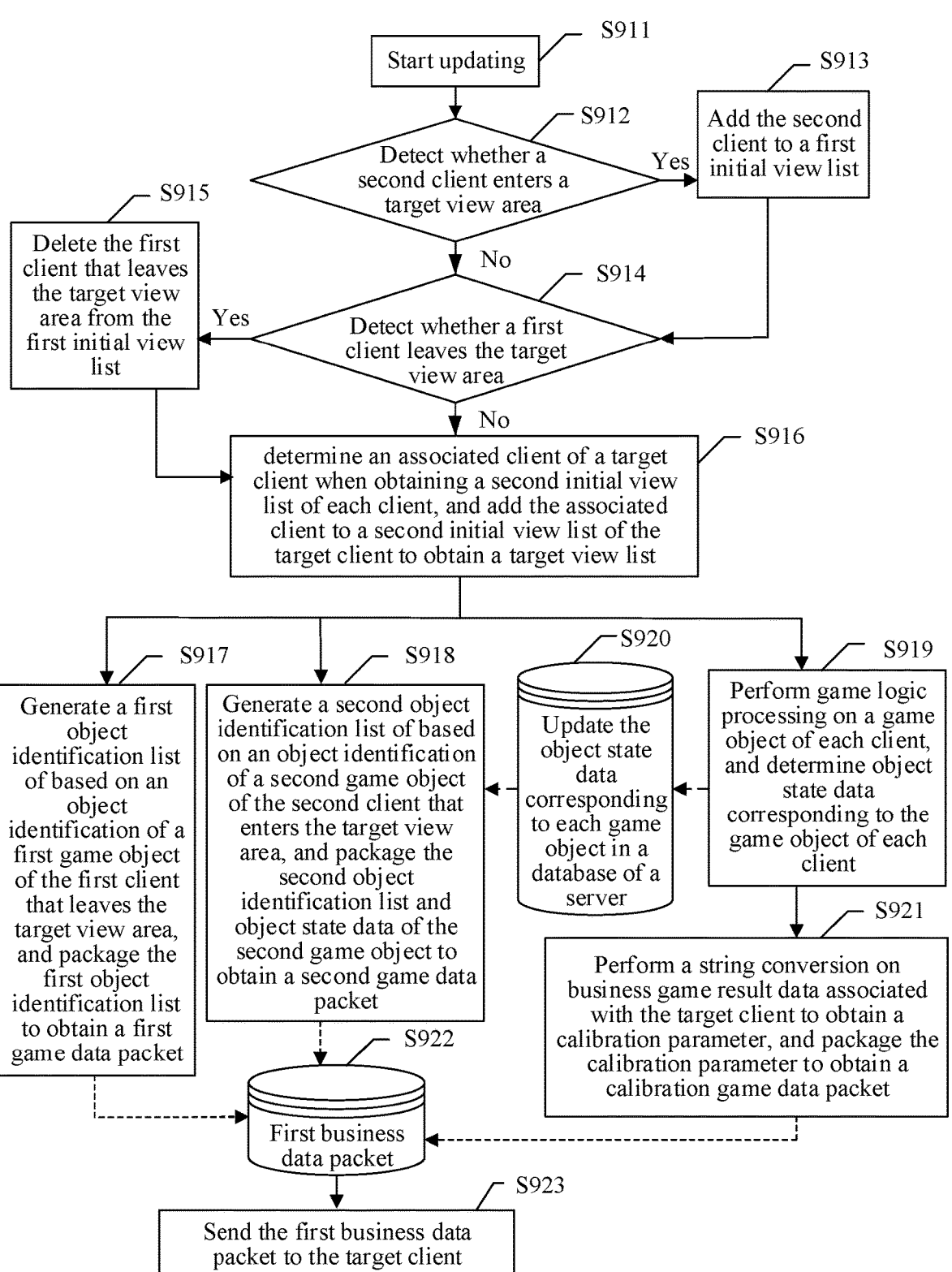
FIG. 9 is a schematic flowchart of a frame synchronization communication solution executed by a business server provided by an embodiment of this disclosure.

For ease of understanding, further, referring to FIG. 9, FIG. 9 is a schematic flowchart of a frame synchronization communication solution executed by a business server provided by an embodiment of this disclosure. As shown in FIG. 9, the business server in the embodiments of this disclosure can be a computer device with a view management function, and the business server can be the server 10W in the embodiment corresponding to the above FIG. 1.

As shown in FIG. 9, when the current game picture frame is switched from the first game picture frame to the second game picture frame, the business server may perform S911 to start traversing and updating each client of the N clients having a network connection relationship with the business server. The embodiments of this disclosure can take the target client as an example to explain the specific implementation that the business server adopts a new communication mode to perform frame synchronization to the target client. It is to be understood that the business server can acquire a first initial view list of the target client (namely, based on a view list generated by the client within the target view area), and then can perform client state detection on the target view area of the target client to obtain a state detection result, and then can update the first initial view list based on the state detection result, and determine the updated first initial view list as a second initial view list of the target client.

The client state detection means that the business server can detect other clients leaving or entering the target view area. For example, the business server may first perform S912 to detect whether other clients enter the target view area. When the state detection result of the business server indicates that there is a second client having a second state, namely, it is detected that the second client enters the target view area, the business server may execute S913, add the second client to the first initial view list, and then may execute S914, and then detect whether other clients leave the target view area. Alternatively, when the state detection result of the business server indicates that there is no second client having the second state, that is, it is not detected that the second client enters the target view area, the business server may skip directly to execute S914. It is to be appreciated that when the state detection result of the business server indicates that there is a first client having a first state, that is, it is detected that the first client leaves the target view area, the business server may perform S915 to delete the first client leaving the target view area from the first initial view list. Alternatively, when the state detection result of the business server indicates that there is no first client having the first state, that is, it is not detected that the first client leaves the target view area, the business server may obtain a second initial view list of the target client.

Alternatively, the business server in the embodiments of this disclosure can also detect whether other clients leave the target view area first, and then detect whether other clients enter the first client of the target view area, and the detection sequence of the business server will not be defined herein. It is to be appreciated that the business server may obtain a second initial view list of each client with reference to the specific implementation of the second initial view list of the target client, which will not be described further herein.

Further, when obtaining the second initial view list of each client, the business server may execute S916 to determine an associated client of the target client, and then the associated client may be added to the second initial view list of the target client to obtain the target view list of the target client. Similarly, the business server may obtain a target view list of each client.

It is to be understood that when executing S915, a business server deletes a first client in a first state (namely, a client leaving a target view area) from a first initial view list, a game object of the deleted first client can be determined as a first game object, and then S917 can be executed to generate a first object identification list based on an object identification of the first game object and package the first object identification list to obtain a first game data packet for sending to a target client. The first game data packet therein can be used for indicating the target client to delete the first game object within the target view area, namely, deleting the displayed first game object from the target view area and locally deleting object data information (including object state data) about the first game object from the target client.

It is understood that the business server may determine a game object of the added second client as a second game object when adding the second client, that is, the client entering the target view area, to the first initial view list in performing S913. The business server can be used for storing object state data corresponding to each client of the N clients, and one object state data is obtained after performing game logic processing on the game object of the corresponding client based on the business server. Further, the business server may perform S918 to obtain the object state data of the second game object and the object identification of the second game object from the database of the server. Further, the business server may generate a second object identification list based on the object identification of the second game object, and package the object state data of the second game object and the second object identification list to obtain a second game data packet for sending to the target client. The second game data packet may be used to instruct the target client to store object state data of the second game object and create the second game object within the target view area.

By the same reasoning, the business server in the embodiments of this disclosure can also perform S919, based on the to-be-synchronized client of each client, performing game logic processing on the game objects of each client, to determine business game result data associated with each client, and then can determine object state data corresponding to each game object based on the business game result data associated with each client, and then can perform S920, and update the object state data corresponding to each game object in the data of the server.

For example, the business server may obtain business game result data associated with the target client based on a to-be-synchronized client of the target client; the business game result data herein may be used for updating object state data corresponding to a game object of the target client in a database of the business server. It can be appreciated that the number of to-be-synchronized clients of the target client can be M; M can be a positive integer less than N; the M to-be-synchronized clients can include a first to-be-synchronized client belonging to a first view type and a second to-be-synchronized client belonging to a second view type. The first game result data is game result data corresponding to first to-be-synchronized client determined by the business server; the second initial game data includes a key code value sent by the second to-be-synchronized client. At this time, the business server can use the CS mode to perform game logic processing on the key code value sent by the second to-be-synchronized client, so that game result data corresponding to the second to-be-synchronized client can be obtained. At this time, the embodiments of this disclosure can refer to the game result data corresponding to the second to-be-synchronized client determined by the business server as the first verification result data. Further, the business server may determine business game result data associated with the target client based on the first game result data corresponding to the first to-be-synchronized client and the first verification result data.

In order to effectively ensure the security of data transmission between the business server and the target client, the business server may also execute S921, when the business game result data associated with the target client is acquired, acquiring a summary strategy for the business game result data, and further performing string conversion on the business game result data associated with the target client based on the summary strategy to obtain a calibration parameter. Further, the business server may package the calibration parameter to obtain a calibration game data packet to instruct the target client to perform data calibration on the first business data packet sent by the business server.

At this time, the business server may perform S922 to determine a first business data packet for sending to the target client, and may further perform S923 to send the first business data packet to the target client. It can be understood that the first business data packet is dynamically changed according to the actual situation when the first game picture frame is switched to the second game picture frame. For example, if a target view area of a target client changes during a switching process of a game picture frame, and a business interaction relationship exists between the target client and a client in a target view list, the first business data packet may include a first game data packet, a second game data packet, first game result data of a first to-be-synchronized client, and second initial game data of a second to-be-synchronized client. Of course, when there is a security risk of tampering in the data transmission mode between the target client and the business server, the first business data packet also needs to include a calibration game data packet and first initial game data of the first to-be-synchronized client, so that the target client can verify the reliability of the data.

For example, if the target view area of a target client changes during a switching process of a game picture frame, and a business interaction relationship does not exist between the target client and a client in a target view list, the first business data packet needs to include a first game data packet or a second game data packet. If the target view area of the target client does not change during the game picture frame switching process, and there is a business interaction relationship between the target client and the clients in the target view list, the first business data packet may include the first game result data of a first to-be-synchronized client and second initial game data of a second to-be-synchronized client.

Figure 10:
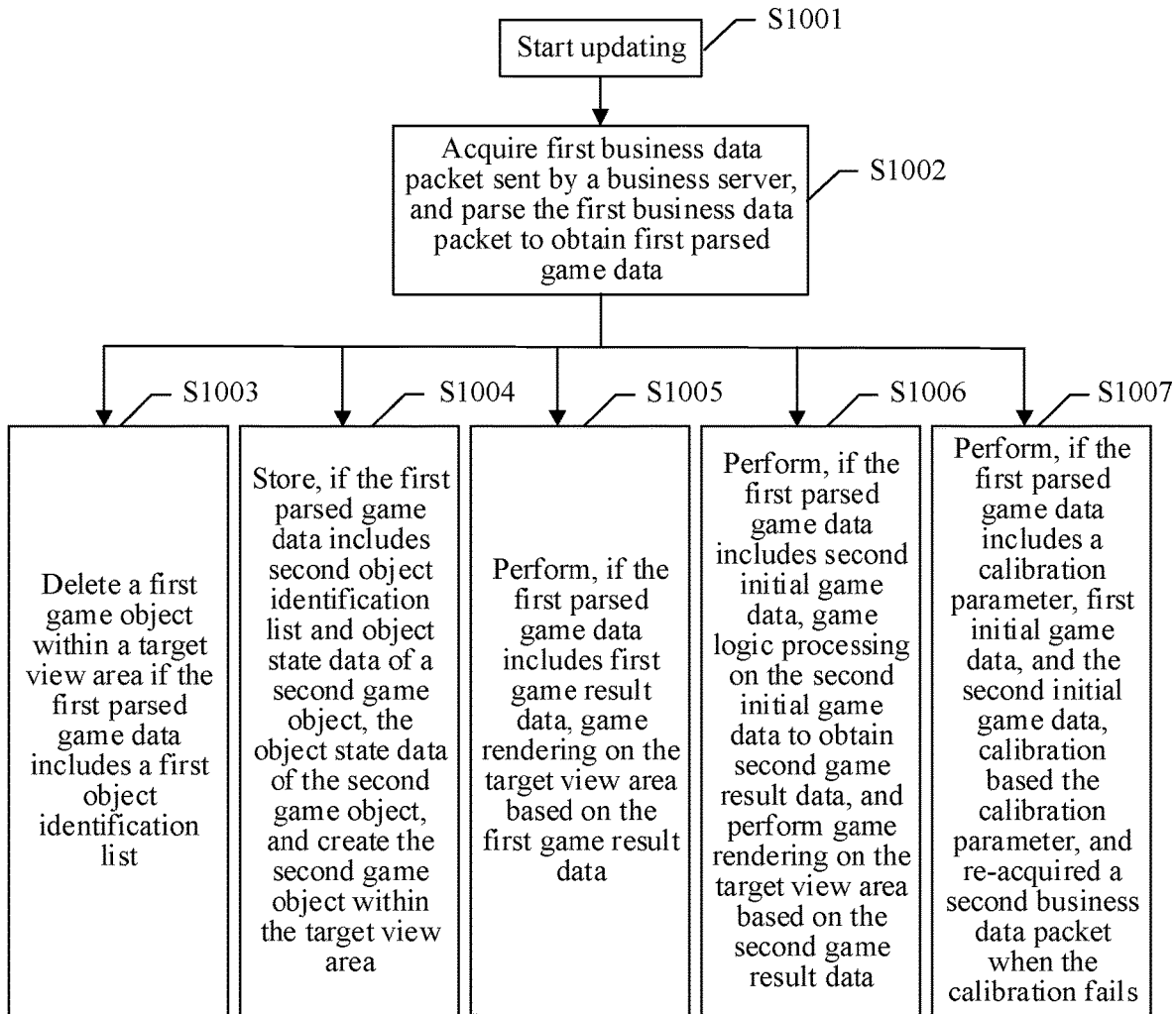
FIG. 10 is a schematic flowchart of a frame synchronization communication solution executed by a target client provided by an embodiment of this disclosure.

Further, referring to FIG. 10, FIG. 10 is a schematic flowchart of a frame synchronization communication solution executed by a target client provided by an embodiment of this disclosure. As shown in FIG. 10, a target client in an embodiment of this disclosure can be a client operated by any terminal device in a terminal device cluster in the above embodiment corresponding to FIG. 1, for example, a client operated by a terminal device 100*a*.

As shown in FIG. 10, when the current game picture frame is switched from the first game picture frame to the second game picture frame, the target client may perform S1001 to start updating. It is to be understood that when executing S1002, the target client may acquire the first business data packet associated with the to-be-synchronized client sent by the business server, and may further parse the first business data packet to obtain first parsed game data. For example, a first data packet transmitted by the server and associated with a to-be-synchronized client is acquired. The first data packet is parsed to obtain first parsed game data, the to-be-synchronized client being identified by the server based on a view list of the target client. The to-be-synchronized client belongs to the N clients, the view list identifying a client associated with a view area of the target client in a game scene. The to-be-synchronized client has a relative view type that indicates whether the to-be-synchronized client is visible to the target client in the game scene.

It is to be understood that if the first business data packet includes a first game data packet generated by the business server based on a client leaving the target view area (namely, a client in a first state), the first parsed game data may include a first object identification list generated by the business server based on the first game object identification, and at this moment, the target client may execute S1003 to delete the first game object within the target view area, namely, deleting the displayed first game object from the target view area and locally deleting the object data information (including the object state data) of the first game object from the target client.

Alternatively, if the first business data packet includes a second game data packet generated by the business server based on a second client entering the target view area (namely, a client in a second state), the first parsed game data may include a second object identification list generated by the business server based on the second game object identification and object state data of the second game object, and at this time, the target client may execute S1004, store the object state data of the second game object, and create the second game object in the target view area.

Alternatively, if the first parsed game data includes the first game result data of the first to-be-synchronized client, the target client may directly execute S1005 to perform game rendering on the target view area based on the first game result data, such as synchronizing a game bullet of the first to-be-synchronized client, displaying an attacked skill animation, and updating object state data of a game object of the target client. For example, when the first parsed game data comprises first game result data, game rendering is performed on the view area of the target client based on the first game result data that is obtained after the server performs game logic processing on first initial game data associated with a first to-be-synchronized client having a relative view type indicating that the to-be-synchronized client is not visible to the target client.

Alternatively, if the first parsed game data includes second initial game data of the second to-be-synchronized client, the target client may directly execute S1006 to perform game logic processing on the key code value in the second initial game data to obtain second game result data, and then may perform game rendering on the target view area based on the second game result data. For example, when the first parsed game data comprises second initial game data, game logic processing is performed on the second initial game data to obtain second game result data, and game rendering is performed on the view area of the target client based on the second game result data. The second initial game data is associated with a second to-be-synchronized client having a relative view type indicating that the to-be-synchronized client is visible to the target client.

Alternatively, if the first parsed game data includes a calibration parameter, first initial game data, first game result data, and second initial game data, the target client may execute S1007 to perform game logic processing on the first initial game data to obtain game result data corresponding to the first to-be-synchronized client; the game result data corresponding to the first to-be-synchronized client determined by the target client may be referred to as second verification result data in the embodiments of this disclosure. Further, the target client may determine the client game result data associated with the target client based on the second verification result data and the second game result data corresponding to the second initial game data. Since the calibration parameter here is obtained after the business server performs string conversion on the business game result data associated with the target client through the summary strategy, the target client can perform string conversion on the client game result data through the same summary strategy to obtain the to-be-verified parameter. Further, the target client may compare the to-be-verified parameter and the calibration parameter to obtain a comparison result, and if the comparison result indicates that the to-be-verified parameter and the calibration parameter are consistent, the target client may determine that the first business data packet belongs to a business data packet of a normal type, that is, the calibration is successful. In an embodiment, if the comparison result indicates that the to-be-verified parameter is not consistent with the calibration parameter, the target client determines that the first business data packet belongs to an abnormal type of business data packet, namely, the calibration fails, and further the target client needs to send a business data retry request to the business server so that the business server determines a second business data packet associated with the target client according to the business data retry request. When receiving the second business data packet returned by the business server, the target client may parse the second business data packet to obtain second parsed game data, and then may perform game rendering on the target view area of the target client again via the second parsed game data.

The embodiments of this disclosure may provide a new communication mode that combines the advantages of a first communication mode (for example, CS mode) and a second communication mode (for example, CC mode for short). A computer device (for example, a business server) having a view management function may obtain a target view list of a target client from N clients having a network connection relationship with the business server; N is a positive integer greater than 1. Further, the business server may determine a to-be-synchronized client of the target client based on the target view list to determine relevant game data for sending to the target client according to a relative view type of the to-be-synchronized client, for example, if the relative view type of the to-be-synchronized client determined by the business server is a first view type (namely, being outside a target view area), the business server may perform game logic processing on first initial game data associated with the to-be-synchronized client to obtain first game result data for sending to the target client; so that the target client performs game rendering on the target view area. Alternatively, if the relative view type of the to-be-synchronized client determined by the business server is a second view type (namely, being within the target view area), the business server may directly send second initial game data associated with the to-be-synchronized client to the target client, so that the target client performs game logic processing on the second initial game data, thereby obtaining second game result data; the second game result data is used for indicating the target client to perform game rendering on the target view area. It means that the business server of an embodiment of this disclosure can not only synchronize the relevant game data of a client within a target view area to the target client, but also synchronize the relevant game data of an associated client outside the target view area to the target client, and using this new communication mode can design a game based on "frames" and absolutely synchronize within the view, so that the synchronization efficiency of game data can be improved. In addition, when there is a problem such as power-off or network disconnection, the solution does not need to calculate full amounts of frames as in the pure CC mode, and can quickly acquire relevant game data from a business server via a new communication mode to improve the game experience. Of course, since the business server has a global state, the global view area can be cut to obtain the target view area of each client, which can effectively prevent the view from being hung to improve the security of game data.

Figure 11:
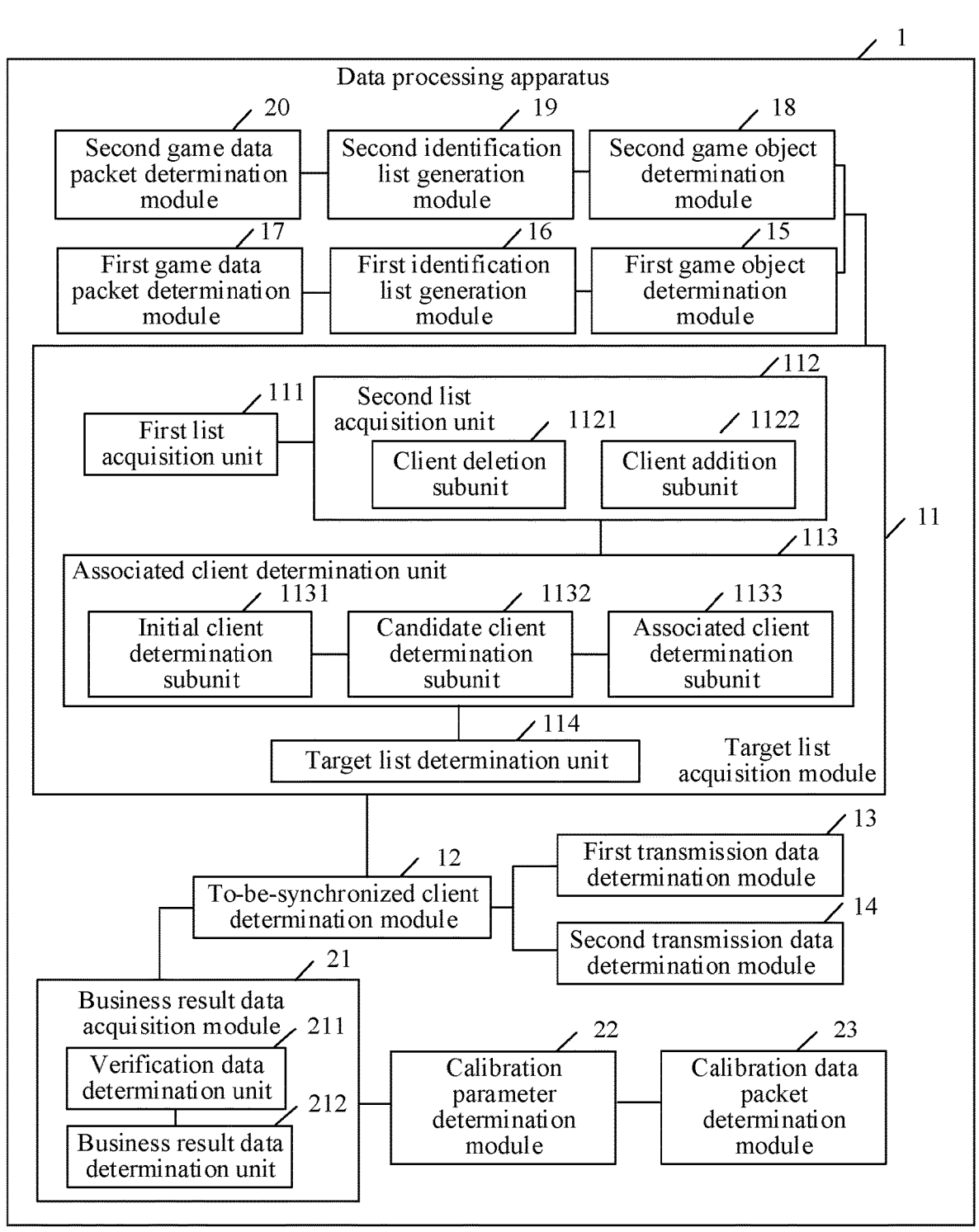
FIG. 11 is a structural diagram of a data processing apparatus provided by an embodiment of this disclosure.

Further, referring to FIG. 11, FIG. 11 is a structural diagram of a data processing apparatus provided by an embodiment of this disclosure. The data processing apparatus 1 can be a computer program (including a program code) running in a computer device, for example, the data processing apparatus 1 is an application software. The data processing apparatus 1 may be used for performing corresponding steps in a method provided by an embodiment of this disclosure. As shown in FIG. 11, the data processing apparatus 1 may operate on a computer device (for example, a business server) having a view management function, and the business server may be the server 210W in the embodiment corresponding to FIG. 2 described above. The data processing apparatus 1 may include a target list acquisition module 11, a to-be-synchronized client determination module 12, a first transmission data determination module 13, a second transmission data determination module 14, a first game object determination module 15, a first identification list generation module 16, a first game data packet determination module 17, a second game object determination module 18, a second identification list generation module 19, a second game data packet determination module 20, a business result data acquisition module 21, a calibration parameter determination module 22, and a calibration data packet determination module 23.

The target list acquisition module 11 is configured to acquire a target view list of a target client from N clients having a network connection relationship with a business server, the N being a positive integer greater than 1, and the target view list being used for identifying a client associated with a target view area of the target client in a game scene.

The target list acquisition module 11 includes the first list acquisition unit 111, the second list acquisition unit 112, the associated client determination unit 113, and the target list determination unit 114.

The first list acquisition unit 111 is configured to perform client state detection on the target view area of the target client from the N clients having the network connection relationship with the business server to obtain a state detection result.

The second list acquisition unit 112 is configured to update a first initial view list of the target client based on the state detection result, and determine the updated first initial view list as a second initial view list of the target client.

The first initial view list includes a first client within a target view area.

The second list acquisition unit 112 includes: the client deletion subunit 1121 and the client addition subunit 1122.

The client deletion subunit 1121 is configured to delete, in a case that the state detection result indicates that there is a first client with a first state, the first client in the first state from the first initial view list, the first state referring to a business state changed from within the target view area to outside the target view area.

The client addition subunit 1122 is configured to add, in a case that the state detection result indicates that there is a second client with a second state, the second client to the first initial view list, the second state referring to a business state changed from outside the target view area to within the target view area, and the first client and the second client both belonging to the N clients.

The specific implementation methods of the client deletion subunit 1121 and the client addition subunit 1122 can refer to the description of performing client state detection on a target view area in the above embodiment corresponding to FIG. 3, and the description will not be repeated here.

The associated client determination unit 113 is configured to determine an associated client of the target client according to the second initial view list corresponding to each client of the N clients.

The associated client determination unit 113 includes an initial client determination subunit 1131, a candidate client determination subunit 1132, and an associated client determination subunit 1133.

The initial client determination subunit 1131 is configured to determine a client in the second initial view list of the target client as an initial client.

The candidate client determination subunit 1132 is configured to determine a candidate client of the target client based on the second initial view list of the initial client and the second initial view list of the target client.

The associated client determination subunit 1133 is configured to take the candidate client as an associated client of the target client when detecting that there is a business interaction relationship between the candidate client and the initial client.

The specific implementation methods of the initial client determination subunit 1131, the candidate client determination subunit 1132, and the associated client determination subunit 1133 can refer to the description of the associated client in the above embodiment corresponding to FIG. 3, and the description will not be continued here.

The target list determination unit 114 is configured to add the associated client to the second initial view list of the target client and take the added second initial view list as the target view list of the target client.

The specific implementation methods of the first list acquisition unit 111, the second list acquisition unit 112, the associated client determination unit 113, and the target list determination unit 114 can refer to the above description of S101 in the corresponding embodiment of FIG. 3, and the description will not be continued here.

The to-be-synchronized client determination module 12 is configured to determine a to-be-synchronized client of the target client based on the target view list, the to-be-synchronized client, and the target client both belonging to the N clients, and the to-be-synchronized client having a relative view type, the relative view type being used for identifying a view type of the to-be-synchronized client relative to the target client in the game scene.

The first transmission data determination module 13 is configured to perform, in response to a first to-be-synchronized client with the relative view type being a first view type in the to-be-synchronized client, game logic processing on first initial game data associated with the first to-be-synchronized client to obtain first game result data for transmitting to the target client, the first game result data being used for indicating the target client to perform game rendering on the target view area.

The second transmission data determination module 14 is configured to transmit, in response to a second to-be-synchronized client with the relative view type being a second view type in the to-be-synchronized client, second initial game data associated with the second to-be-synchronized client to the target client to cause the target client to perform game logic processing on the second initial game data to obtain second game result data, the second game result data being used for indicating the target client to perform game rendering on the target view area.

The first game object determination module 15 is configured to determine, in response to deleting the first client in the first state from the first initial view list, a game object of the deleted first client as a first game object.

The first identification list generation module 16 is configured to generate a first object identification list based on an object identification of the first game object.

The first game data packet determination module 17 is configured to package the first object identification list to obtain a first game data packet for transmitting to the target client, the first game data packet being used for indicating the target client to delete the first game object within the target view area.

The business server is used for storing object state data corresponding to each client of the N clients, and one object state data is obtained after performing game logic processing on the game object of the corresponding client based on the business server.

The second game object determination module 18 is configured to determine, in adding the second client to the first initial view list, a game object of the added second client as a second game object, and acquiring object state data of the second game object and an object identification of the second game object.

The second identification list generation module 19 is configured to generate a second object identification list based on an object identification of the second game object.

The second game data packet determination module 20 is configured to package the object state data of the second game object and the second object identification list to obtain a second game data packet for transmitting to the target client, the second game data packet being used for indicating the target client to store the object state data of the second game object and creating the second game object within the target view area.

The business result data acquisition module 21 is configured to obtain business game result data associated with the target client based on a to-be-synchronized client of the target client; the business game result data herein may be used for updating object state data corresponding to a game object of the target client in a database of the business server.

The number of the to-be-synchronized clients is M, the M being a positive integer less than N; the M to-be-synchronized clients include the first to-be-synchronized clients belonging to the first view type and the second to-be-synchronized clients belonging to the second view type; the first game result data is game result data corresponding to the first to-be-synchronized client; and the second initial game data includes a key code value transmitted by the second to-be-synchronized client.

The business result data acquisition module 21 includes: a verification data determination unit 211 and a business result data determination unit 212.

The verification data determination unit 211 is configured to perform game logic processing on the key code value transmitted by the second to-be-synchronized client to obtain first verification result data corresponding to the second to-be-synchronized client.

The business result data determination unit 212 is configured to determine business game result data associated with the target client based on the first game result data corresponding to the first to-be-synchronized client and the first verification result data.

The specific implementation of the verification data determination unit 211 and the business result data determination unit 212 can refer to the description of the business game result data in the embodiment corresponding to FIG. 3 above, and the description will not be continued here.

The calibration parameter determination module 22 is configured to acquire a summary strategy for the business game result data, and perform a string conversion on the business game result data based on the summary strategy to obtain a calibration parameter.

The calibration data packet determination module 23 is configured to package the calibration parameter to obtain a calibration game data packet for transmitting to the target client, the calibration game data packet being used for indicating the target client to perform data calibration on a first business data packet transmitted by the business server.

The specific implementation of a target list acquisition module 11, a to-be-synchronized client determination module 12, a first transmission data determination module 13, a second transmission data determination module 14, a first game object determination module 15, a first identification list generation module 16, a first game data packet determination module 17, a second game object determination module 18, a second identification list generation module 19, a second game data packet determination module 20, a business result data acquisition module 21, a calibration parameter determination module 22, and a calibration data packet determination module 23 can refer to the description of S101 to S104 in the above embodiment corresponding to FIG. 3, and the description thereof will not be continued. In addition, the description of beneficial effects of the same method are not described herein again.

Figure 12:
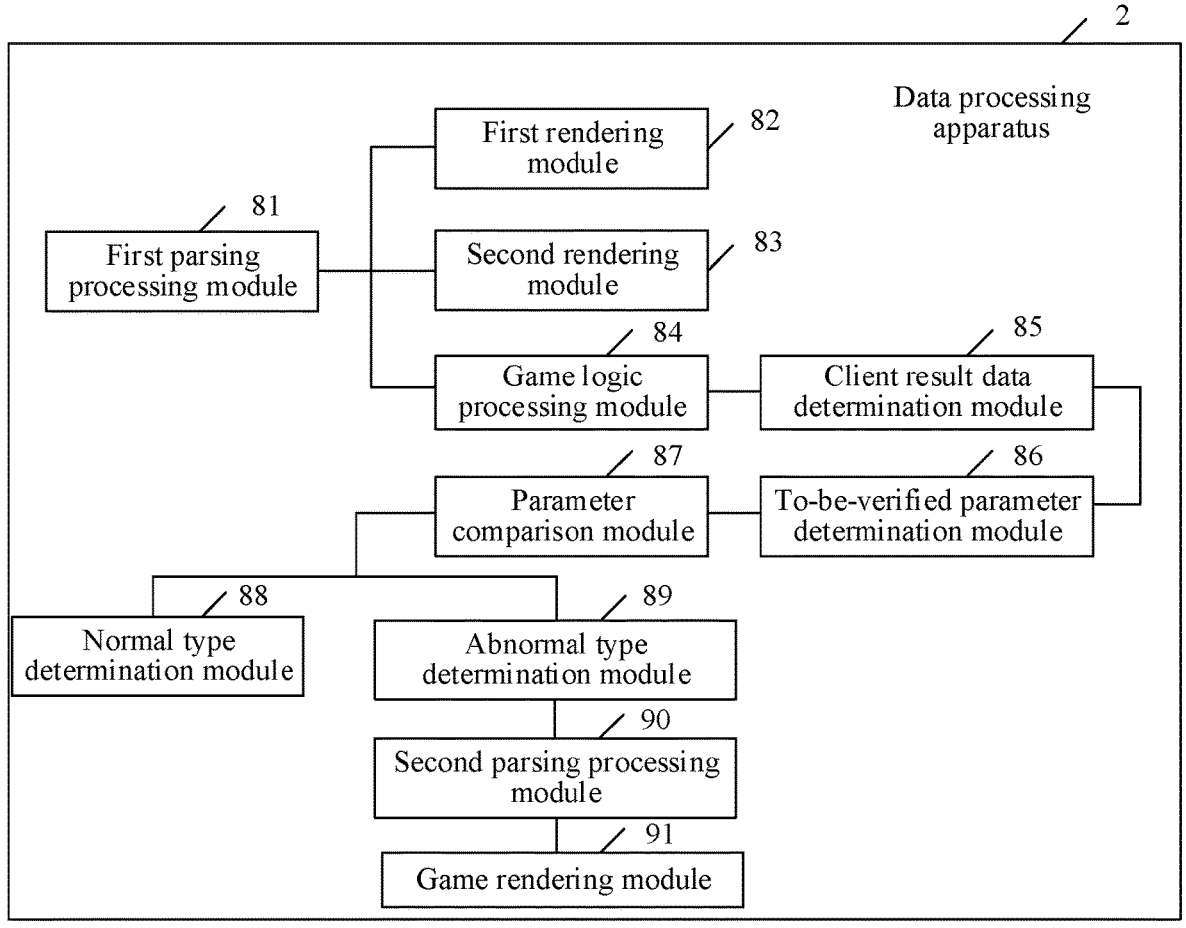
FIG. 12 is a structural diagram of a data processing apparatus provided by an embodiment of this disclosure.

Further, referring to FIG. 12, FIG. 12 is a structural diagram of a data processing apparatus provided by an embodiment of this disclosure. The data processing apparatus 2 can be a computer program (including a program code) running in a computer device, for example, the data processing apparatus 2 is an application software. The data processing apparatus 2 may be used for performing corresponding steps in a method provided by an embodiment of this disclosure. As shown in FIG. 12, the data processing apparatus 2 can run on a target client, and the target client can be a client A run by the terminal device 200a in the embodiment corresponding to the above FIG. 2. The data processing apparatus 2 may include: a first parsing processing module 81, a first rendering module 82, a second rendering module 83, a game logic processing module 84, a client result data determination module 85, a to-be-verified parameter determination module 86, a parameter comparison module 87, a normal type determination module 88, an abnormal type determination module 89, a second parsing processing module 90, and a game rendering module 91.

The first parsing processing module 81 is configured to acquire a first business data packet transmitted by the business server corresponding to a target client and associated with a to-be-synchronized client; and parse the first business data packet to obtain first parsed game data, the to-be-synchronized client being determined by the business server based on a target view list of the target client, the to-be-synchronized client and the target client both belonging to N clients having a network connection relationship with the business server, the N being a positive integer greater than 1, the target view list being used for identifying a client associated with a target view area of the target client in a game scene, the to-be-synchronized client having a relative view type, and the relative view type being used for identifying a view type of the to-be-synchronized client relative to the target client in the game scene.

The first rendering module 82 is configured to perform, in a case that the first parsed game data includes first game result data, game rendering on the target view area of the target client based on the first game result data, the first game result data being obtained after the business server performs game logic processing on first initial game data associated with a first to-be-synchronized client, and the first to-be-synchronized client being a client with the relative view type being a first view type in the to-be-synchronized client.

The second rendering module 83 is configured to perform, in a case that the first parsed game data includes second initial game data, game logic processing on the second initial game data to obtain second game result data and perform game rendering on the target view area of the target client based on the second game result data, the second initial game data being associated with a second to-be-synchronized client, and the second to-be-synchronized client being a client with the relative view type being a second view type in the to-be-synchronized client.

The game logic processing module 84 is configured to perform, in a case that the first parsed game data includes a calibration parameter, the first initial game data, and the second initial game data, game logic processing on the first initial game data to obtain second verification result data, the calibration parameter being obtained after the business server performs string conversion on the business game result data associated with the target client via a summary strategy.

The client result data determination module 85 is configured to determine client game result data associated with the target client based on the second verification result data and the second game result data corresponding to the second initial game data.

The to-be-verified parameter determination module 86 is configured to perform string conversion on the client game result data via the summary strategy to obtain a to-be-verified parameter.

The parameter comparison module 87 is configured to compare the to-be-verified parameter with the calibration parameter to obtain a comparison result.

The normal type determination module 88 is configured to determine that the first business data packet belongs to a normal type of business data packet in the case that the comparison result indicates that the to-be-verified parameter is consistent with the calibration parameter.

The abnormal type determination module 89 is configured to determine that the first business data packet belongs to an abnormal type of business data packet in a case that the comparison result indicates that the to-be-verified parameter is not consistent with the calibration parameter, and transmit a business data retry request to the business server to cause the business server to determine a second business data packet associated with the target client according to the business data retry request.

The second parsing processing module 90 is configured to parse, in receiving the second business data packet returned by the business server, the second business data packet to obtain second parsed game data.

The game rendering module 91 is configured to perform game rendering on the target view area of the target client through the second parsed game data.

The specific implementation methods of the first parsing processing module 81, the first rendering module 82, the second rendering module 83, the game logic processing module 84, the client result data determination module 85, the to-be-verified parameter determination module 86, the parameter comparison module 87, the normal type determination module 88, the abnormal type determination module 89, the second parsing processing module 90, and the game rendering module 91 can be seen from the description of S1001 to S1007 in the embodiment corresponding to FIG. 10 above, and redundant description will not be continued here. In addition, the description of beneficial effects of the same method are not described herein again.

Figures 13, 14:
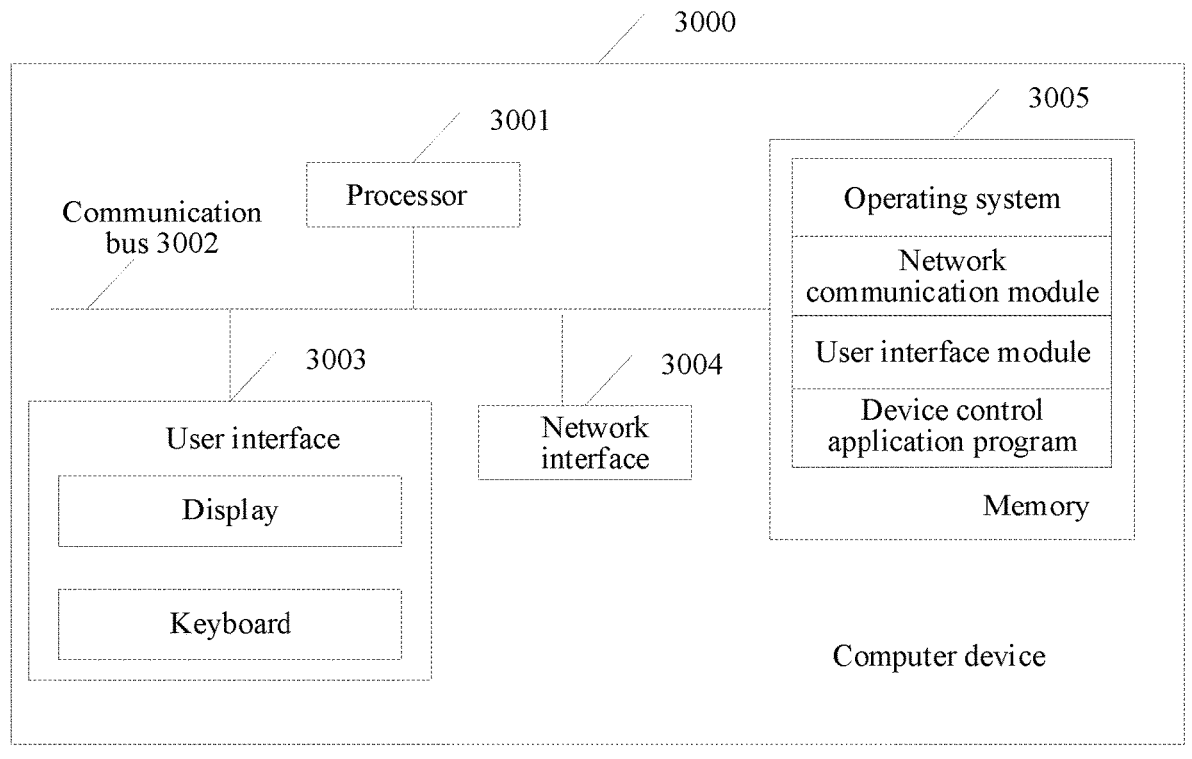
FIG. 13 is a diagram of a computer device provided by an embodiment of this disclosure.
FIG. 14 is a structural diagram of a data processing system provided by an embodiment of this disclosure.

Further, Referring to FIG. 13, FIG. 13 is a diagram of a computer device provided by an embodiment of this disclosure. As shown in FIG. 13, the computer device 3000 can be a computer device (for example, a business server) with a view management function in the embodiment corresponding to the above FIG. 2, the business server can be a server 210W in the embodiment corresponding to the above FIG. 2, and the computer device 3000 can include: at least one processor 3001, for example, a central processing unit (CPU) or processing circuitry, at least one network interface 3004, a user interface 3003, a memory 3005 (non-transitory computer-readable storage medium), and at least one communication bus 3002. The communication bus 3002 is configured to implement connection communication between these components. The user interface 3003 may include a display and a keyboard, and the network interface 3004 may include a standard wired interface and a wireless interface (for example, a WI-FI interface). The memory 3005 may be a high-speed RAM or may be a non-volatile memory, such as at least one disk memory. The memory 3005 may be at least one storage apparatus located remotely from the foregoing processor 3001. As shown in FIG. 13, the memory 3005, as a computer storage medium, may include an operating system, a network communication module, a user interface module, and a device control application program.

In the computer device 3000 shown in FIG. 13, the network interface 3004 is mainly used for network communication with a target client. The user interface 3003 is mainly used for providing an interface for a user to input. The processor 3001 can be used to call the device control application program stored in memory 3005.

It should be understood that the computer device 3000 as described in the embodiments of this disclosure may carry out the description of the data processing method as described in the embodiments according to FIG. 3 or FIG. 8 above, and may also carry out the description of the data processing apparatus 1 as described in the embodiments according to FIG. 11 above, or the data processing apparatus 2 as described in the embodiments according to FIG. 12, which will not be described again here. In addition, the description of beneficial effects of the same method are not described herein again.

Furthermore, it is to be pointed out herein that this disclosure further provides a non-transitory computer-readable storage medium storing computer programs executed by the foregoing data processing apparatus 1 or data processing apparatus 2, and the computer programs include program instructions; a processor, when executing the program instructions, are able to perform the description of the foregoing data processing method in the embodiments corresponding to FIG. 3 or FIG. 8, and therefore will not be repeated herein. In addition, the description of beneficial effects of the same method are not described herein again. For technical details that are not disclosed in the computer storage medium embodiments of this disclosure, refer to the descriptions of the method embodiments of this disclosure. By way of example, the above program instructions may be deployed to be executed on one computer device, or may be deployed to be executed on a plurality of computer devices located on one site, or be executed on a plurality of computer devices distributed at a plurality of sites and interconnected by a communication network, which may form a block chain system.

An aspect of this disclosure provides a computer program product or computer program including computer programs/instructions; the computer programs/instructions, when executed by a processor, cause the computer device to perform the above description of the data processing method in embodiments corresponding to FIG. 3 or FIG. 8, and will not be described in detail herein. In addition, the description of beneficial effects of the same method is not described herein again.

In an embodiment, a non-transitory computer-readable storage medium stores computer-readable instructions which, when executed by a computer device, cause the computer device to perform a data processing method that includes acquiring a view list of a target client from N clients having a network connection relationship with a server, N being a positive integer greater than 1. The view list identifies at least one client associated with a view area of the target client in a game scene. The method further includes determining a to-be-synchronized client of the target client based on the view list, the to-be-synchronized client being one of the N clients. The to-be-synchronized client has a relative view type, the relative view type identifying whether the to-be-synchronized client is visible to the target client in the game scene. The method further includes, in response to a first to-be-synchronized client having a relative view type indicating that the first to-be-synchronized client is not visible to the target client, performing game logic processing on first initial game data associated with the first to-be-synchronized client to obtain first game result data for transmitting to the target client. The first game result data is used by the target client to perform game rendering on the view area. The method further includes, in response to a second to-be-synchronized client with a relative view type indicating that the second to-be-synchronized client is visible to the target client, transmitting second initial game data associated with the second to-be-synchronized client to the target client to enable the target client to perform game logic processing on the second initial game data to obtain second game result data. The second game result data is used by the target client to perform game rendering on the view area.

In an embodiment, a non-transitory computer-readable storage medium stores computer-readable instructions which, when executed by a computer device, cause the computer device to perform a data processing method that is executed by a terminal device provided with a target client, the target client being one of N clients having a network connection relationship with a server, N being a positive integer greater than 1. The data processing method includes acquiring a first data packet transmitted by the server and associated with a to-be-synchronized client and parsing the first data packet to obtain first parsed game data. The to-be-synchronized client is identified by the server based on a view list of the target client, the to-be-synchronized client belonging to the N clients. The view list identifies a client associated with a view area of the target client in a game scene, the to-be-synchronized client having a relative view type that indicates whether the to-be-synchronized client is visible to the target client in the game scene. The method further includes, when the first parsed game data comprises first game result data, performing game rendering on the view area of the target client based on the first game result data that is obtained after the server performs game logic processing on first initial game data associated with a first to-be-synchronized client having a relative view type indicating that the to-be-synchronized client is not visible to the target client. The method further includes, when the first parsed game data comprises second initial game data, performing game logic processing on the second initial game data to obtain second game result data, and performing game rendering on the view area of the target client based on the second game result data. The second initial game data is associated with a second to-be-synchronized client having a relative view type indicating that the to-be-synchronized client is visible to the target client.

Further, referring to FIG. 14, FIG. 14 is a structural diagram of a data processing system provided by an embodiment of this disclosure. The data processing system 3 may include data processing apparatus 1a and data processing apparatus 2a. The data processing apparatus 1a may be the data processing apparatus 1 in the embodiment corresponding to the above FIG. 11, and it will be understood that the data processing apparatus 1a may be integrated in the server 210W in the embodiment corresponding to the above FIG. 2, and therefore will not be described in detail herein. The data processing apparatus 2a may be the data processing apparatus 2 in the embodiment corresponding to FIG. 12 described above, and it will be understood that the data processing apparatus 2a may be integrated in the terminal device 200a in the embodiment corresponding to FIG. 2 described above, and therefore will not be described in detail herein. In addition, the description of beneficial effects of the same method are not described herein again. For technical details that are not disclosed in the data processing system embodiments of this disclosure, refer to the descriptions of the method embodiments of this disclosure.

Those ordinarily skilled in the art may understand that, implementing all or part of the flow of the methods of the above embodiments may be accomplished by instructing the related hardware via the computer-readable programs. The programs may be stored on a computer-readable storage medium; the programs, when executed, may include the flow of the embodiments of the above methods. The above storage medium may be a magnetic disc, an optical disc, a read-only memory (ROM), a random-access memory (RAM), and the like.

The term module (and other similar terms such as unit, submodule, etc.) in this disclosure may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module.

The use of "at least one of" in the disclosure is intended to include any one or a combination of the recited elements. For example, references to at least one of A, B, or C; at least one of A, B, and C; at least one of A, B, and/or C; and at least one of A to C are intended to include only A, only B, only C or any combination thereof.

The foregoing disclosure includes some exemplary embodiments of this disclosure which are not intended to limit the scope of this disclosure. Other embodiments shall also fall within the scope of this disclosure.

What is claimed is:

1. A data processing method, comprising:
acquiring a view list of a target client from N clients having a network connection relationship with a server, N being a positive integer greater than 1, and the view list identifying at least one client associated with a view area of the target client in a game scene;
determining a to-be-synchronized client of the target client based on the view list, the to-be-synchronized client being one of the N clients, and the to-be-synchronized client having a relative view type, the relative view type identifying whether the to-be-synchronized client is visible to the target client in the game scene;
in response to a first to-be-synchronized client having a relative view type indicating that the first to-be-synchronized client is not visible to the target client, performing game logic processing on first initial game data associated with the first to-be-synchronized client to obtain first game result data for transmitting to the target client, the first game result data being used by the target client to perform game rendering on the view area; and
in response to a second to-be-synchronized client with a relative view type indicating that the second to-be-synchronized client is visible to the target client, transmitting second initial game data associated with the second to-be-synchronized client to the target client to enable the target client to perform game logic processing on the second initial game data to obtain second game result data, the second game result data being used by the target client to perform game rendering on the view area.

2. The method according to claim 1, wherein the acquiring comprises:
performing client state detection on the view area of the target client from the N clients having the network connection relationship with the server to obtain a state detection result;
updating a first initial view list of the target client based on the state detection result, and determining the updated first initial view list as a second initial view list of the target client;
determining an associated client of the target client according to a second initial view list corresponding to each client in the N clients; and
adding the associated client to the second initial view list of the target client, and setting the second initial view list after the adding as the view list of the target client.

3. The method according to claim 2, wherein
the first initial view list comprises a first client within the view area; and
the updating the first initial view list comprises:
when the state detection result indicates that there is a first client that has moved from within the view area to outside the view area, deleting the first client from the first initial view list; and
when the state detection result indicates that there is a second client that has moved from outside the view area to within the view area, adding the second client to the first initial view list, the first client and the second client both included in the N clients.

4. The method according to claim 2, wherein the determining the associated client of the target client according to the second initial view list comprises:
determining a client in the second initial view list of the target client as an initial client;
determining a candidate client of the target client based on a second initial view list of the initial client and the second initial view list of the target client; and
taking the candidate client as the associated client of the target client in response to detecting an interaction relationship between the candidate client and the initial client.

5. The method according to claim 3, further comprising:
in response to the deleting the first client from the first initial view list, determining a game object of the deleted first client as a first game object;
generating a first object identification list based on an object identification of the first game object; and
packaging the first object identification list to obtain a first game data packet for transmitting to the target client, the first game data packet being used by the target client to delete the first game object within the view area.

6. The method according to claim 3, wherein the server stores object state data corresponding to each client of the N clients, and the object state data is obtained after the server performs game logic processing on a game object of a corresponding client.

7. The method according to claim 6, further comprising:
during adding the second client to the first initial view list, determining a game object of the added second client as a second game object, and acquiring object state data of the second game object and an object identification of the second game object;
generating a second object identification list based on the object identification of the second game object; and
packaging the object state data of the second game object and the second object identification list to obtain a second game data packet for transmitting to the target client, the second game data packet being used by the target client to store the object state data of the second game object and displaying the second game object within the view area.

8. The method according to claim 1, further comprising:

acquiring game result data associated with the target client based on the to-be-synchronized client of the target client, the game result data including updated object state data corresponding to a game object of the target client in a database of the server;

acquiring a summary strategy for the game result data, and performing a string conversion on the game result data based on the summary strategy to obtain a calibration parameter; and packaging the calibration parameter to obtain a calibration game data packet for transmitting to the target client, the calibration game data packet being used by the target client to perform data calibration on a first data packet transmitted by the server.

9. The method according to claim 8, wherein there are M to-be-synchronized clients, M being a positive integer less than N;

the M to-be-synchronized clients comprise the first to-be-synchronized client and the second to-be-synchronized client;

the first game result data is game result data corresponding to the first to-be-synchronized client; and the second initial game data comprises a key code value transmitted by the second to-be-synchronized client; and the acquiring the game result data associated with the target client comprises:

performing game logic processing on the key code value transmitted by the second to-be-synchronized client to obtain first verification result data corresponding to the second to-be-synchronized client; and determining the game result data associated with the target client based on the first game result data corresponding to the first to-be-synchronized client and the first verification result data.

10. A data processing method executed by a terminal device provided with a target client, the target client being one of N clients having a network connection relationship with a server, N being a positive integer greater than 1, the method comprising:

acquiring a first data packet transmitted by the server and associated with a to-be-synchronized client and parsing the first data packet to obtain first parsed game data, the to-be-synchronized client being identified by the server based on a view list of the target client, the to-be-synchronized client belonging to the N clients, the view list identifying a client associated with a view area of the target client in a game scene, the to-be-synchronized client having a relative view type that indicates whether the to-be-synchronized client is visible to the target client in the game scene;

when the first parsed game data comprises first game result data, performing game rendering on the view area of the target client based on the first game result data that is obtained after the server performs game logic processing on first initial game data associated with a first to-be-synchronized client having a relative view type indicating that the to-be-synchronized client is not visible to the target client; and when the first parsed game data comprises second initial game data, performing game logic processing on the second initial game data to obtain second game result data, and performing game rendering on the view area of the target client based on the second game result data, the second initial game data being associated with a second to-be-synchronized client having a relative view type indicating that the to-be-synchronized client is visible to the target client.

11. The method according to claim 10, further comprising:

when the first parsed game data comprises a calibration parameter, the first initial game data, and the second initial game data, performing game logic processing on the first initial game data to obtain second verification result data, the calibration parameter being generated by the server performing string conversion on the game result data associated with the target client via a summary strategy;

determining client game result data associated with the target client based on the second verification result data and the second game result data corresponding to the second initial game data;

performing string conversion on the client game result data via the summary strategy to obtain a to-be-verified parameter;

comparing the to-be-verified parameter with the calibration parameter to obtain a comparison result; and verifying the first data packet when the comparison result indicates that the to-be-verified parameter is consistent with the calibration parameter.

12. The method according to claim 11, further comprising:

determining that the first data packet is abnormal when the comparison result indicates that the to-be-verified parameter is not consistent with the calibration parameter, and transmitting a data retry request to the server to cause the server to generate a second data packet associated with the target client according to the data retry request;

parsing, in receiving the second data packet returned by the server, the second data packet to obtain second parsed game data; and performing game rendering on the view area of the target client through the second parsed game data.

13. A data processing apparatus, comprising:

processing circuitry configured to acquire a view list of a target client from N clients having a network connection relationship with the apparatus, N being a positive integer greater than 1, and the view list identifying at least one client associated with a view area of the target client in a game scene;

determine a to-be-synchronized client of the target client based on the view list, the to-be-synchronized client being one of the N clients, and the to-be-synchronized client having a relative view type, the relative view type identifying whether the to-be-synchronized client is visible to the target client in the game scene;

in response to a first to-be-synchronized client having a relative view type indicating that the first to-be-synchronized client is not visible to the target client, perform game logic processing on first initial game data associated with the first to-be-synchronized client to obtain first game result data for transmitting to the target client, the first game result data being used by the target client to perform game rendering on the view area; and in response to a second to-be-synchronized client with a relative view type indicating that the second to-be-synchronized client is visible to the target client, transmit second initial game data associated with the second to-be-synchronized client to the target client to enable the target client to perform game logic processing on the second initial game data to obtain second game result data, the second game result data being used by the target client to perform game rendering on the view area.

14. The apparatus according to claim 13, wherein the processing circuitry is further configured to:

perform client state detection on the view area of the target client from the N clients having the network connection relationship with the apparatus to obtain a state detection result;

update a first initial view list of the target client based on the state detection result, and determine the updated first initial view list as a second initial view list of the target client;

determine an associated client of the target client according to a second initial view list corresponding to each client in the N clients; and add the associated client to the second initial view list of the target client, and set the second initial view list after the addition as the view list of the target client.

15. The apparatus according to claim 14, wherein the first initial view list comprises a first client within the view area; and the processing circuitry is further configured to:

when the state detection result indicates that there is a first client that has moved from within the view area to outside the view area, delete the first client from the first initial view list; and when the state detection result indicates that there is a second client that has moved from outside the view area to within the view area, add the second client to the first initial view list, the first client and the second client both included in the N clients.

16. The apparatus according to claim 14, wherein the processing circuitry is further configured to:

determine a client in the second initial view list of the target client as an initial client;

determine a candidate client of the target client based on a second initial view list of the initial client and the second initial view list of the target client; and take the candidate client as the associated client of the target client in response to detecting an interaction relationship between the candidate client and the initial client.

17. The apparatus according to claim 15, wherein the processing circuitry is further configured to:

in response to the deleting the first client from the first initial view list, determine a game object of the deleted first client as a first game object;

generate a first object identification list based on an object identification of the first game object; and package the first object identification list to obtain a first game data packet for transmitting to the target client, the first game data packet being used by the target client to delete the first game object within the view area.

18. The apparatus according to claim 15, wherein the apparatus stores object state data corresponding to each client of the N clients, and the object state data is obtained after the apparatus performs game logic processing on a game object of a corresponding client.

19. The apparatus according to claim 18, wherein the processing circuitry is further configured to:

during adding the second client to the first initial view list, determine a game object of the added second client as a second game object, and acquire object state data of the second game object and an object identification of the second game object;

generate a second object identification list based on the object identification of the second game object; and package the object state data of the second game object and the second object identification list to obtain a second game data packet for transmitting to the target client, the second game data packet being used by the target client to store the object state data of the second game object and displaying the second game object within the view area.

20. The apparatus according to claim 13, wherein the processing circuitry is further configured to:

acquire game result data associated with the target client based on the to-be-synchronized client of the target client, the game result data including updated object state data corresponding to a game object of the target client in a database of the apparatus;

acquire a summary strategy for the game result data, and perform a string conversion on the game result data based on the summary strategy to obtain a calibration parameter; and package the calibration parameter to obtain a calibration game data packet for transmitting to the target client, the calibration game data packet being used by the target client to perform data calibration on a first data packet transmitted by the apparatus.

\* \* \* \* \*